US005646702A

United States Patent [19]
Akinwande et al.

[11] Patent Number: 5,646,702
[45] Date of Patent: Jul. 8, 1997

[54] FIELD EMITTER LIQUID CRYSTAL DISPLAY

[75] Inventors: Akintunde Ibitayo (Tayo) Akinwande, Bloomington, Minn.; Kalluri R. Sarma, Mesa, Ariz.

[73] Assignee: Honeywell Inc., Minneapolis, Minn.

[21] Appl. No.: 331,771

[22] Filed: Oct. 31, 1994

[51] Int. Cl.[6] .................... G02F 1/1335; G02F 1/343
[52] U.S. Cl. ............................... 349/69; 349/144
[58] Field of Search .................... 359/48, 49, 50; 349/61, 69, 143, 144

[56] References Cited

U.S. PATENT DOCUMENTS

| | | | |
|---|---|---|---|
| 4,800,375 | 1/1989 | Silverstein et al. | 340/703 |
| 4,840,460 | 6/1989 | Bernot et al. | 359/55 |
| 5,126,865 | 6/1992 | Sarma | 359/59 |
| 5,162,931 | 11/1992 | Holmberg | 359/54 |
| 5,168,074 | 12/1992 | Sarma | 437/51 |
| 5,170,100 | 12/1992 | Shichao et al. | 315/366 |
| 5,191,452 | 3/1993 | Sarma | 359/59 |
| 5,204,659 | 4/1993 | Sarma | 340/784 |
| 5,214,347 | 5/1993 | Gray | 313/355 |
| 5,229,691 | 7/1993 | Shichao et al. | 315/366 |
| 5,347,201 | 9/1994 | Liang et al. | 315/366 |
| 5,402,143 | 3/1995 | Ge et al. | 345/102 |
| 5,420,054 | 5/1995 | Choi et al. | 437/38 |
| 5,424,605 | 6/1995 | Lovoi | 313/422 |
| 5,449,970 | 9/1995 | Kumar et al. | 313/495 |

OTHER PUBLICATIONS

L.D. Karpov et al, "Some Ways to Increase Brightness Stability of Flat Displays Based on Field Emissions," presented at IEEE Electron Devices Society Sixth International Vacuum Microelectronics Conference, Jul. 14, 1993 (Abstract).

*Primary Examiner*—William L. Sikes
*Assistant Examiner*—Tiep H. Nguyen
*Attorney, Agent, or Firm*—John G. Shudy, Jr.; Ronald E. Champion; Brett A. Carlson

[57] ABSTRACT

A liquid crystal display having pixels illuminated by field emitter arrays. The field emitter arrays may be utilized to illuminate each pixel individually or to be a backlight lamp to illuminate the whole display, whether monochrome or color. A field emitter array back-lighted liquid crystal displays, whether active matrix or passive, provide greater compactness, higher luminous efficiency, more brightness, and longer lifetime than a fluorescent lamp. Field-emitter arrays may also provide light in various colors for the liquid crystal display thereby eliminating the need for color filters which result in duller colors than that of field emitter arrays. Each color filter absorbs two-thirds of the light that it receives. A color filter liquid crystal color display exhibits colors that have diminished chromaticity and purity in comparison to those of a field emitter array liquid crystal display.

21 Claims, 19 Drawing Sheets

Fig. 6
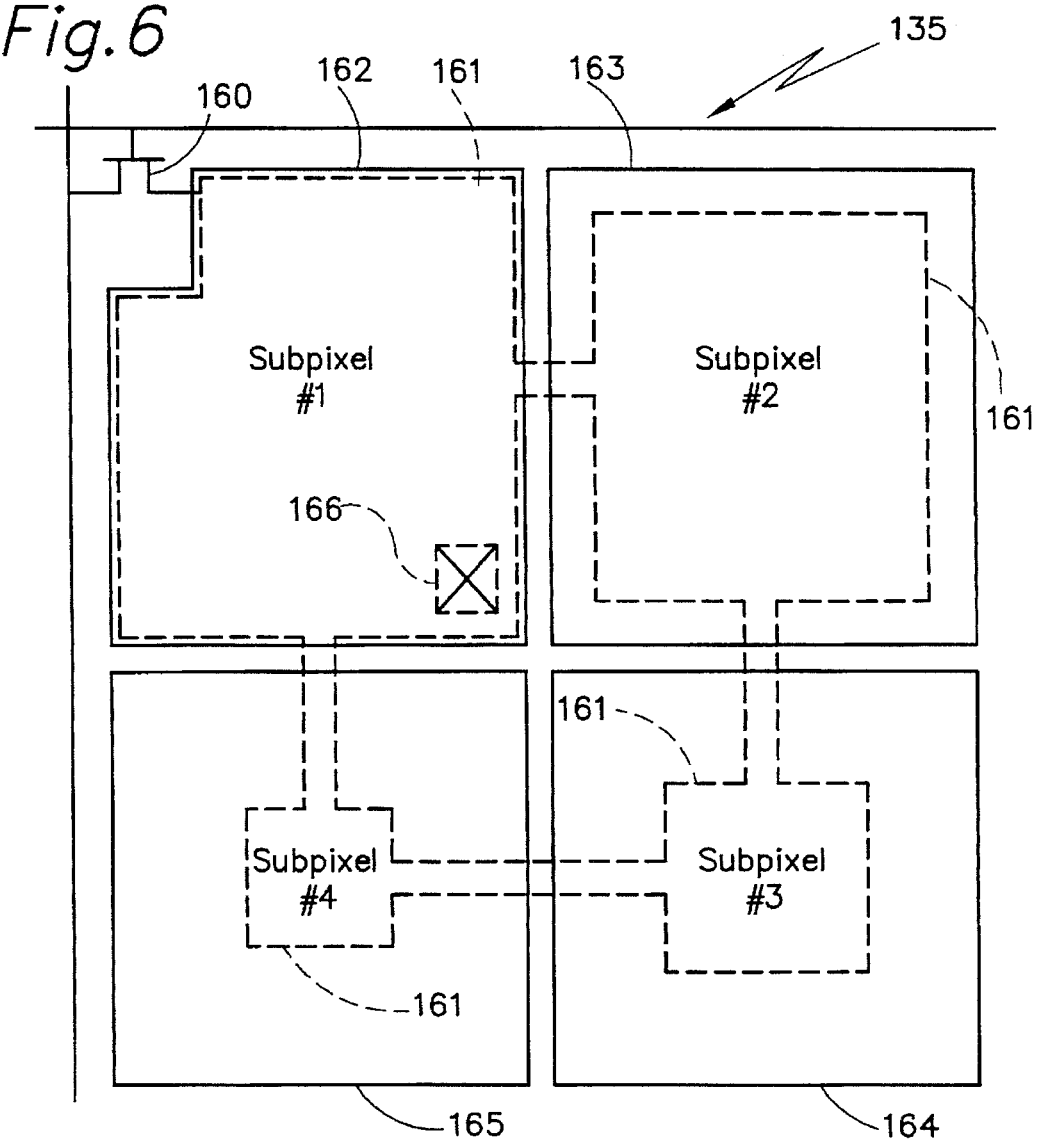
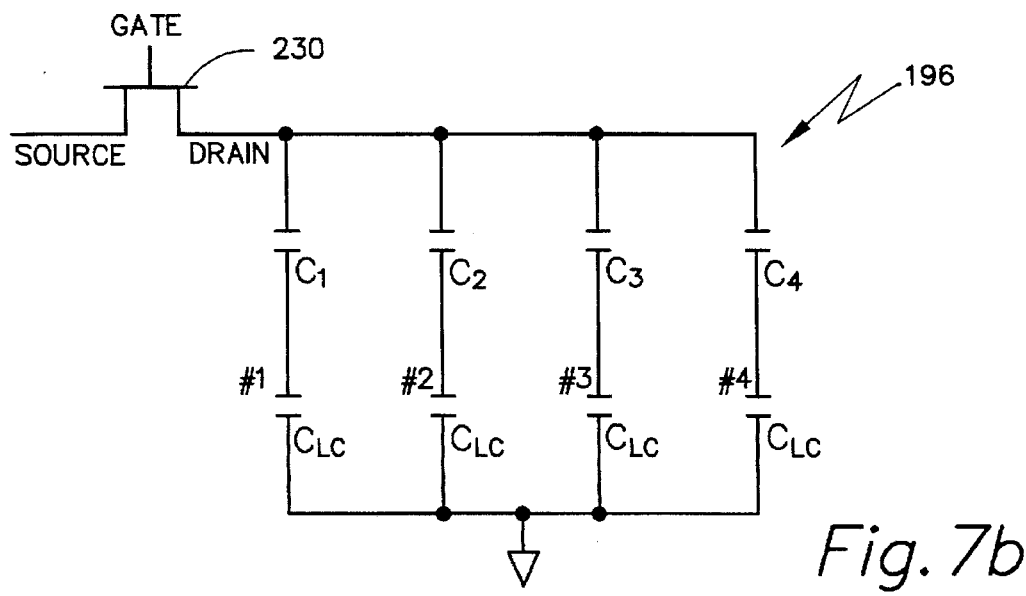
Fig. 7b

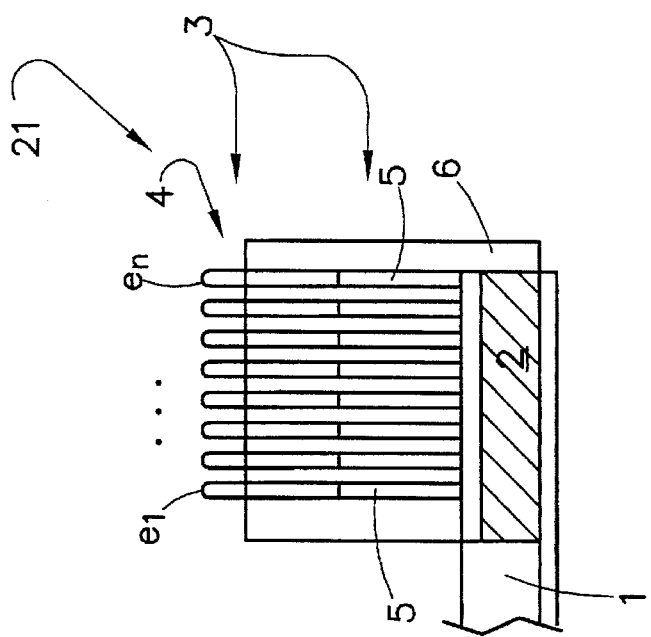
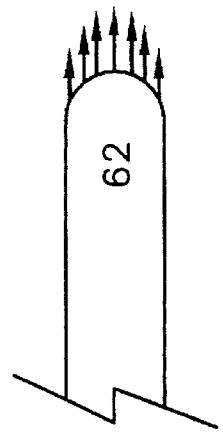
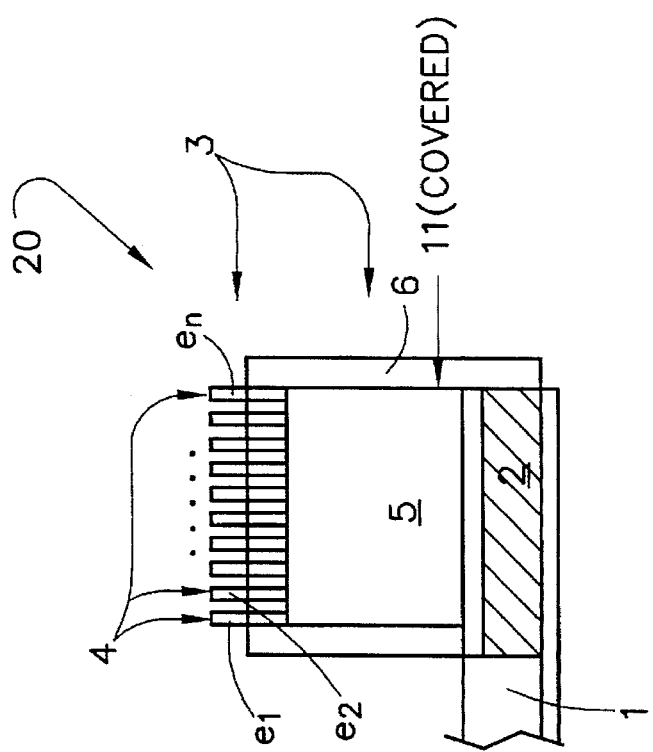
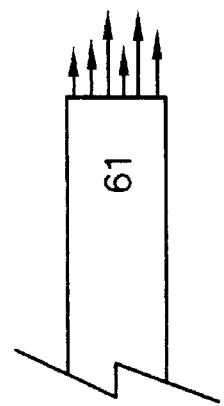

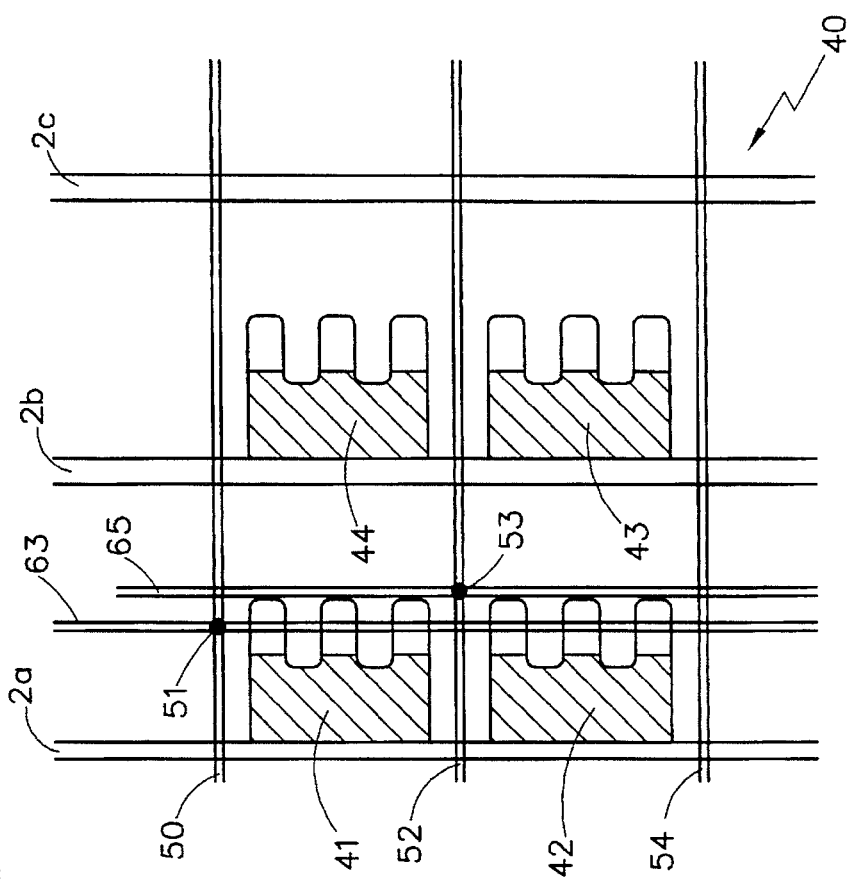
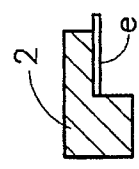
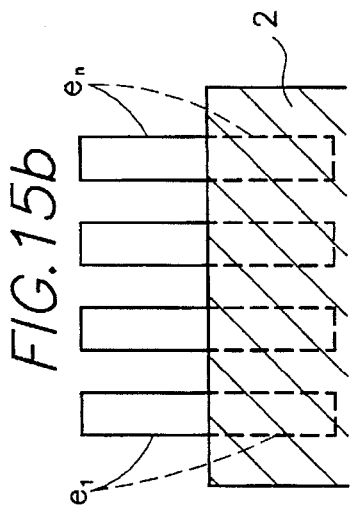
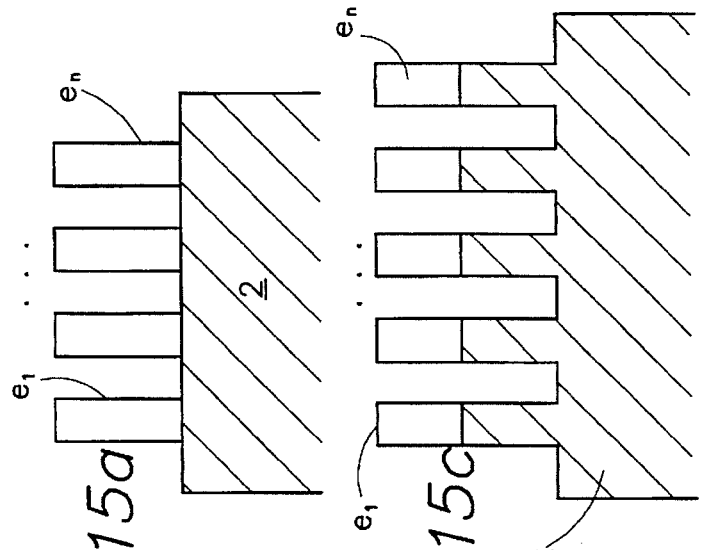

FIELD EMITTER LIQUID CRYSTAL DISPLAY

BACKGROUND OF THE INVENTION

The present invention pertains to displays, and particularly to avionics displays. More particularly, the invention pertains to a flat panel liquid crystal display having high resolution and brightness with low power consumption.

No available electronic display meets the above-noted characteristics needed for a modern avionics display. The cathode ray tube (CRT) has a high luminous efficiency, superior contrast ratios and excellent viewing angles. However, two deficiencies of the CRT are the bulk of the electron gun and large power usage by the deflection amplifiers. There has been much effort expended over the years to develop a flat CRT. Two approaches in the development involved, first, folding the electron gun around to be in parallel with the tube face; and second, producing an electron beam for each pixel by means of an areal cathode and a grid system. Of these approaches, the first one was implemented in the SONY WATCHMAN portable television and the second one was used in a vacuum fluorescent display (VFD) of ISE. These were the only commercial successes of such approaches.

Others have demonstrated the use of a cone field emitter array (CFEA) as the areal cathode. However, both VFD and the CFEA device do not use high luminous efficiency phosphors from which one can obtain from cathodluminescence by employing a high voltage anode circuit. The CFEA device cannot use a high voltage anode because of reliability problems due to field forming of the emitter tip and emitter erosion by particles desorbed, from surfaces by electrons.

A device is needed that retains the advantages of cathodluminescence such as high brightness, high luminous efficiency and good angular viewability, but has the features of compact thinness, random addressability and low power consumption.

SUMMARY OF THE INVENTION

The present invention provides all of the above-mentioned features desired in a display. It is a liquid crystal display having a thin-film-edge field emitter array (FEA) lamp that has a two-dimensional array of matrix addressable (if functioning as individual lamps for each liquid crystal pixel) thin-film-edge field emitters as electron sources for one or more cathodoluminescent screens. The advantages of the present lamp over previous field emitter arrays are that the radius of curvature of the emitter is determined by film deposition resulting in better uniformity and higher current densities, the series resistor for current bias is easier to implement, the fabrication process is based on integrated circuit (IC) and micromachining processes that lead to lower cost manufacturing, emitter burnout is eliminated by using an on-chip focusing electrode which provides for higher reliability and yield, and higher luminous efficiency results because of the use of high voltage phosphors.

Other advantages of this invention are high brightness and high contrast because electron emission current increases exponentially with increasing voltage, leading to high brightness, large dynamic range and high transconductance with the use of thin-film-edge emitters and high-voltage phosphors. Also there is high-yield manufacturing since each liquid crystal pixel may consist of a field emitter array lamp having more than 100 emitting edges leading to a high degree of redundancy. Only a current density of $<5\mu A/cm^2$ is required for a brightness of 1000 fL, assuming a screen voltage of 15 kilovolts and luminous efficiency of 20 lumen/watt. Electrical current equalization resistive elements prevent a single failure from pulling the lamp or line/row of lamps low, leading to a sufficient deflect-tolerant field emitter array lamp liquid crystal display fabrication process.

The edge emitters of the array lamp do not suffer from the deleterious effects of field forming and particle induced desorbtion emitter erosion. Hence, the device can use high-voltage phosphors without any reliability problems. This allows the use of more efficient phosphors and consequently lower power operation for the same brightness and permits high-resolution proximity focusing of the emitted electrons. High-voltage phosphors have long lifetimes because they require less current, and high luminous efficiency phosphors lead to low power consumption.

The field edge emitter array is a lamp that functions as a backlight for a liquid crystal display, in lieu of the usual fluorescent lamp, in a monochrome liquid crystal display, or in a color liquid crystal display having color filters. Such application of the field emitter array may be in the active matrix liquid crystal display as well as in the passive display not having the pixel switching thin film transistors.

The field emitter array lamp has the capability to provide backlight for an avionics display, requiring a brightness of 5000 foot-Lamberts to deliver a display luminance of 150 to 250 foot-Lamberts. The present common backlight technology is the tubular fluorescent lamp which requires optical elements such as a reflector, collimator and a diffuser to obtain good uniformity, but results in a bulky backlight having a low luminous efficiency of less than ten lumens per watt. However, a costly high-brightness flat fluorescent lamp having a hollow cathode can eliminate the need for some of the optical elements, and have a luminous efficiency of 16 lumens per watt and a luminance of 3000 foot Lamberts. Yet, the high-brightness fluorescent lamp has a typical lifetime of only 1000 hours because of significant cathode erosion. The fluorescent backlight typically needs a thermoelectric device and a temperature controller to regulate cold spot temperature to about 43 degrees Centigrade to avoid intolerable inefficient discharge. A fluorescent lamp used in avionics and space liquid crystal displays requires a thermoelectric device and temperature controller to regulate the cold spot temperature, and a heater and controller for enabling low-temperature start-up of the fluorescent lamp. Further, a ballast circuitry is required for dimming, and a diffuser is needed to obtain illumination uniformity which results in lower brightness and lower luminous efficiency of this lamp.

The field emitter array backlight or lamp does not require the optical elements, including the diffuser, and the cooling and heating devices that the fluorescent backlight needs. The field emitter array has simple dimming control circuitry due the high transconductance of the field emitters. Longer lifetime and higher reliability is had with the field emitter array when compared to the fluorescent lamp. The field emitter array lamp and the fluorescent lamp have, respectively, 5000 foot-Lamberts and 3000 foot-Lamberts after the diffuser, provided to a liquid crystal display, 12.5 and 18 watts of power usage, and luminous efficiencies of 25 and 9 lumens per watt.

BRIEF DESCRIPTION OF THE DRAWING

FIG. 6 shows a schematic of a pixel with four subpixels used in the fabrication of a multi-domain halftone gray scale display.

FIG. 7b is an electrical equivalent circuit of the pixel in FIG. 7a.

FIG. 8 shows a basic comb-tooth edge field emitter.

FIGS. 9a and 9b illustrate emitter edges.

FIGS. 11 and 12 show views of another kind of emitter.

FIGS. 15a-d show three comb structures of an emitter.

FIG. 16 reveals an array layout of emitters.

DESCRIPTION OF THE EMBODIMENTS

Figure 1:
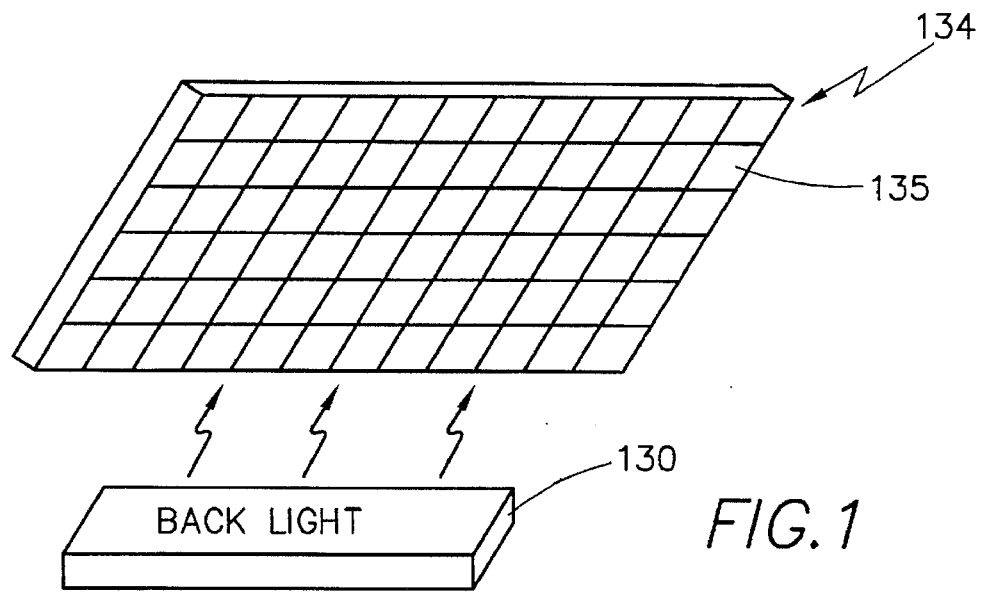
FIG. 1 shows a liquid crystal display having a field emitter array backlight.

The field edge emitter array is a lamp that functions as a backlight 130 for a liquid crystal display 134 in FIG. 1, in lieu of the usual fluorescent lamp, in a monochrome liquid crystal display, or in a color liquid crystal display having color filters. Such application of the field emitter array may be in the active matrix liquid crystal display as well as in the passive display not having the pixel switching thin film transistors.

Several field emitter arrays may be used as backlights to effect a color liquid crystal display not having color filters. For instance, in FIG. 2, three field emitter arrays, as backlights 141, 142 and 143, emitting red, green and blue light, respectively, are sequenced in synchronism, by sequencing electronics 136 which receives signals from pixel addressing electronics 138, with the switching of pixels 135 for receiving images by liquid crystal display 134 to result in a full color display. An assortment of applicable sequencing and addressing schemes are in the art. Pixel addressing electronics 138 provides column address signals and row address signals to effect the switching of pixels 135 to display images, from image data source 140. Red backlight 141 is on when the image template for red is displayed, green backlight 142 is on when the image template for green is displayed, and blue backlight 143 is on when the image template for blue is displayed. The image templates change every one third of a frame. The frame frequency is 60 hertz per second. Thus, each template is present and each respective backlight is on for 1/180 of a second. One sequence of the red, green and blue templates results in a full color image.

Figure 2:
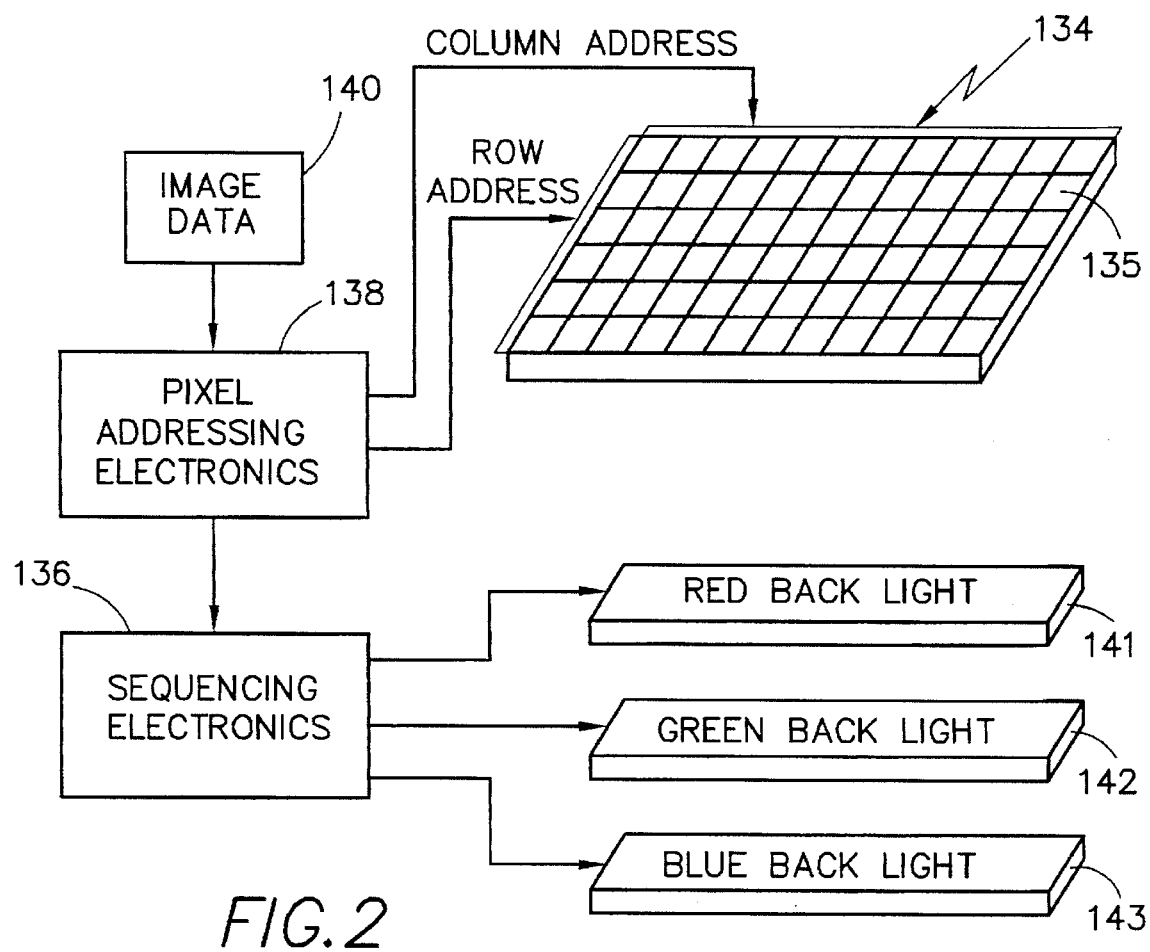
FIG. 2 is a block diagram showing the electronics for sequencing three color field emitter array backlight liquid crystal display.
Figure 5A:
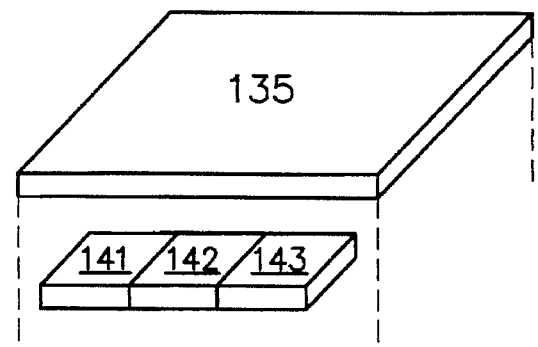
FIG. 5a is an illustration of a three color single pixel field emitter light.
Figure 5B:
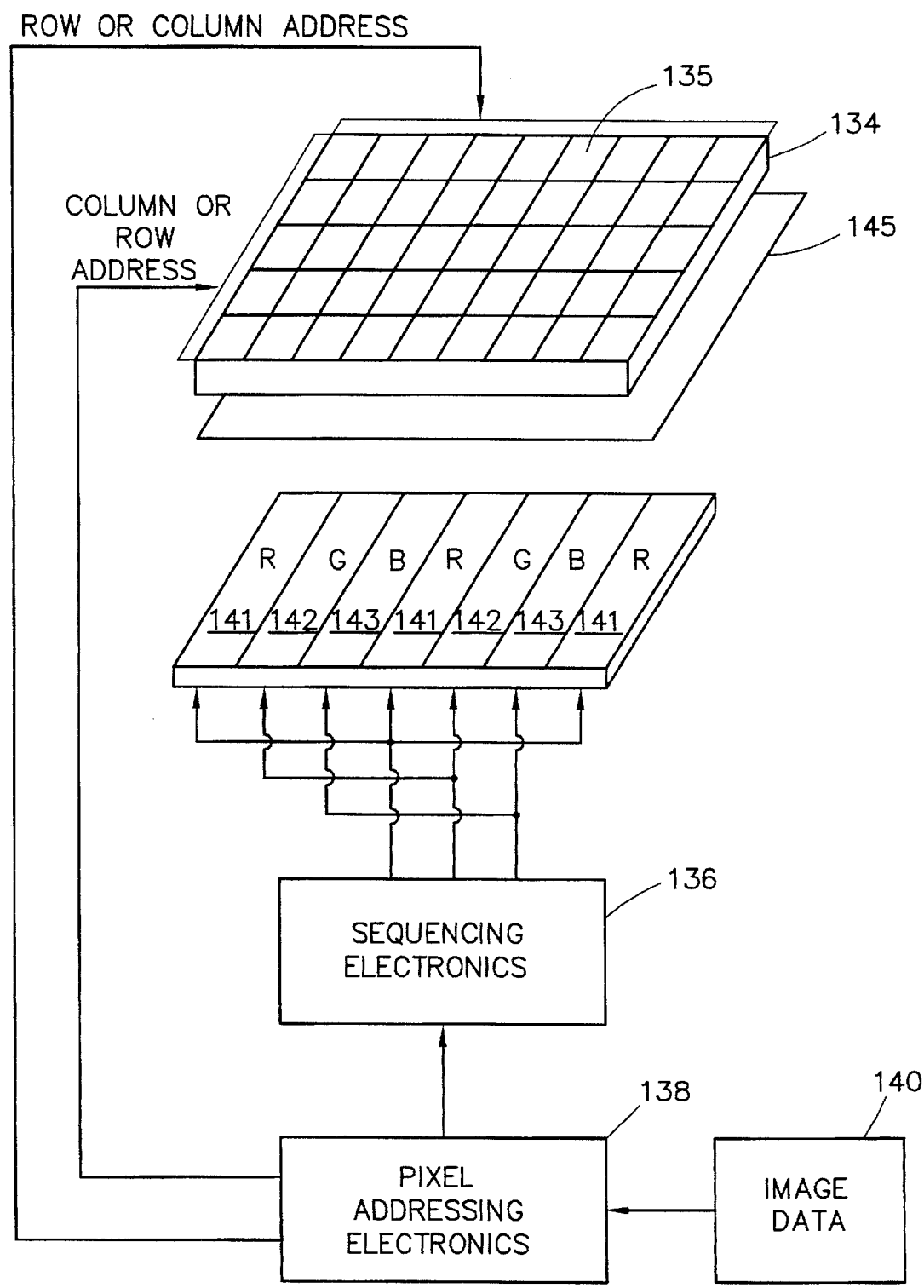
FIG. 5b shows a three color field emitter sequencing strip configuration.

FIG. 5b is a sequencing strip configuration that is similar to that of FIG. 2. However, the form of backlights 141, 142 and 143 is different in that in FIG. 5b they are in the form of strips that are sequenced like the backlights of FIG. 2. Strips 141, 142 and 143 of field emitters emit red, green and blue light, respectively, only one color at time, according to sequence of the templates as described for the system of FIG. 2. The strips may be on a substrate parallel and next to liquid crystal panel 134. The strips may be aligned and in the same direction as the columns or the rows of pixels 135 of panel 134, according to design choice. The width of the strips need not be the same size as that of the columns or rows, which ever the strips are aligned with. The width of the strips may be up to two times as wide as the width of the columns or the rows. The light of the field emitter array strip that is "on" is expected to spill over so that the whole of panel 134 is lit up with one color for the duration of the respective template. A diffuser layer 145 is inserted between the field emitter array strips and panel 134 to diffuse or spread the light to the other columns or rows for uniform lighting of the whole panel 134 when one color of strip light is being emitted.

Figure 5C:
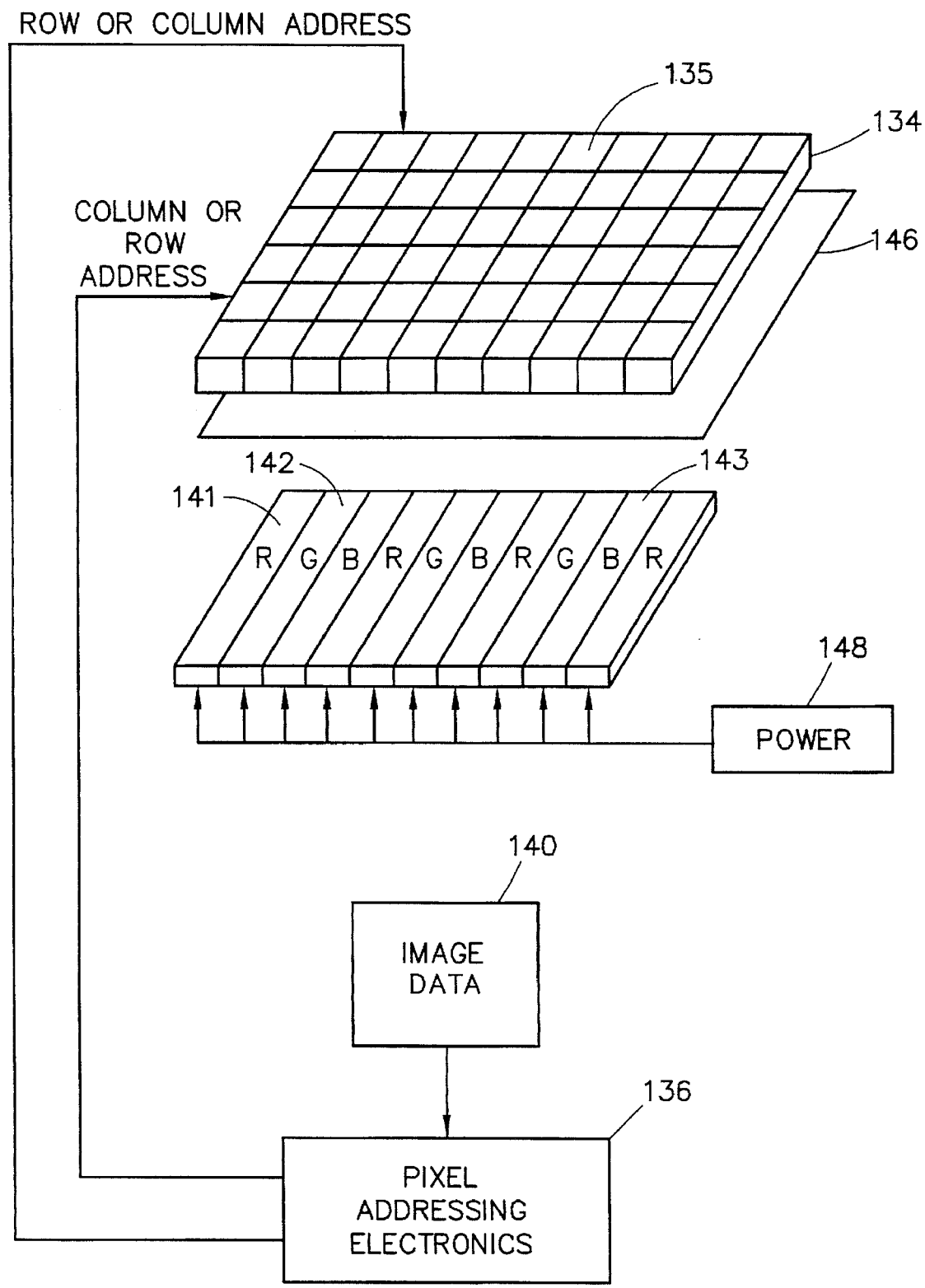
FIG. 5c reveals a three color field emitter additive strip configuration.

A field emitter array additive strip configuration for liquid crystal display 134 is shown in FIG. 5c. Strips 141, 142 and 143 may be aligned with either the columns or the rows of pixels 135 of panel 134. The field emitter array strips may be on a substrate that is parallel and next to panel 134. Strips 141, 142 and 143 must have the same width as the columns or rows of pixels 135 because no spill over or crosstalk can be tolerated as in the sequencing strip configuration. A light collimating layer 146 is inserted between the field emitter array strip substrate and panel 134, for collimating light of the respective strip so that the emitted light goes only to that column or row of pixels 135 with which the strip is aligned. All strips 141, 142 and 143 are connected to power source 148, and emit light for the whole time that liquid crystal display panel 134 is "on". Three pixels 135 of the three colors are additive to produce each color spot in the color display. The pixels 135 control the passage of light through panel 134.

Figure 3:
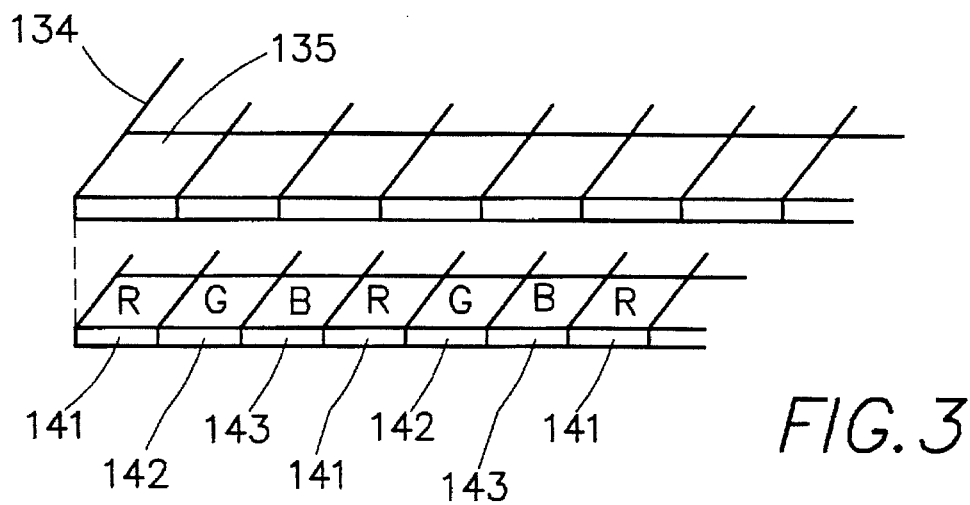
FIG. 3 illustrates an individual pixel field emitter lighting scheme.
Figure 4:
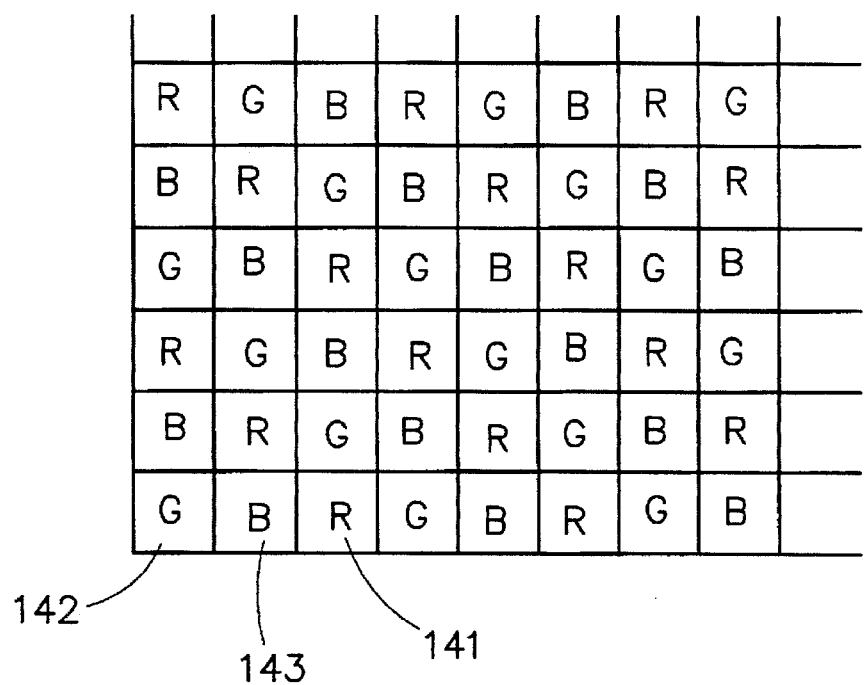
FIG. 4 reveals a three color field emitter pixel lighting pattern.

Further, the field edge emitter array is an integral part of individual pixel 135 lighting for color liquid crystal display 134. Instead of color filters, each pixel 135 has at least one field emitter array or backlight (red) 141, (green) 142 or (blue) 143 proximate to the pixel as shown in FIG. 3. Each pixel 135 adjacent to a side of given pixel has a field emitter array of a differing color than the field emitter array of the given pixel. For example, in FIG. 4, a middle pixel having a red field emitter array is adjacent to two pixels having blue field emitter arrays and to two pixels having green field emitter arrays. For a given color, three pixels of red, green and blue, are turned on at respective proportional amounts to provide the correct mixture of colors of light from the field emitter arrays for the given color. Alternatively, pixel 135 lamps may be sequenced according to color, like the three color backlight configuration of FIG. 2. Another approach is to have field emitters of red, green and blue light within the area of each pixel. Each of the field emitter arrays also may be controlled and switched in synchronism with the respective pixel for light brightness and image control, for added effects.

The field emitter arrays may switch on in combination for providing a particular color for a given pixel rather than having three pixels switch on for providing the desired color spot on the display, even though there may be only one field emitter array per pixel as noted above, because the field emitter light can be fabricated with respect to its associated pixel such that the light of that field emitter array spills over to the adjacent pixels.

Another configuration is where there is more than one field emitter array within each pixel area, as in FIG. 5a. For example, there can be at least three field emitter arrays per pixel, capable of providing light of three different colors such as red, blue and green, or any other combination of a plurality of colors excluding red, blue and/or green. Then, for each pixel, the field emitter arrays may be switched accordingly along with the respective pixel to provide the desired or needed pixel color as dictated by the row and column address lines to the pixel and field emitter arrays.

Field emitter array pixel color lighting is applicable to monochrome (i.e., having no color filters) gray scale liquid crystal displays. The field emitter arrays may be fabricated separately on a substrate and brought in proximity with a liquid crystal display to obtain a field emitter array color lighted liquid crystal display. On the other hand, the field emitter arrays and the liquid crystal display may be integrally fabricated as one unit, using well-known integrated circuit technology.

The liquid crystal display devices that the present field emitter array lamp technology is applicable are active matrix displays as well as passive matrix displays. The active matrix type displays characteristically have a thin film transistor for switching on or off each pixel, for reasons of improved performance. However, each pixel may be switched directly without a transistor, as in the passive matrix liquid crystal display.

Figure 7A:
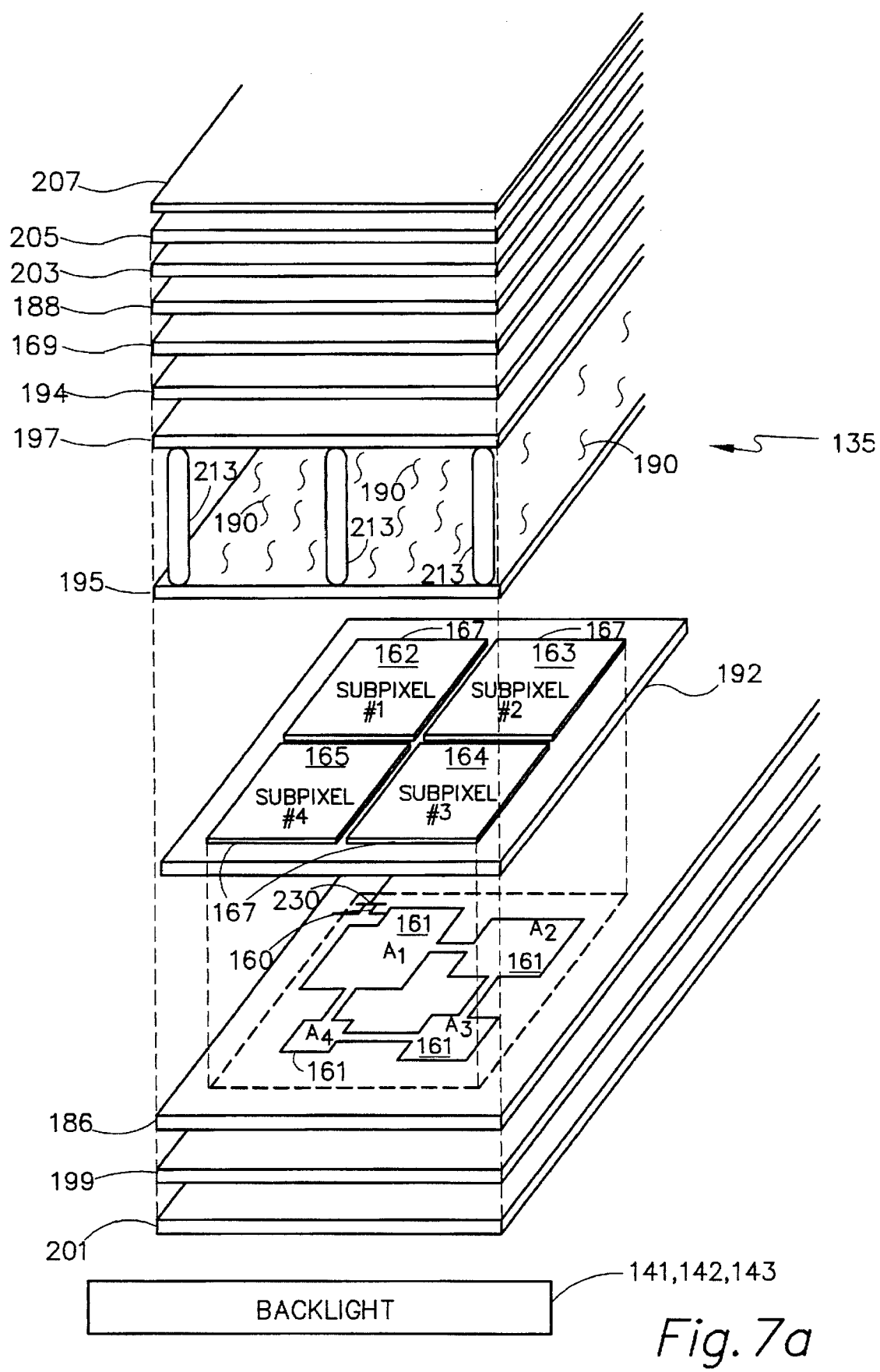
FIG. 7a is a break-away view of the pixel having subpixels with various sized control capacitors.

FIGS. 6, 7a and 7b, illustrate an example of a pixel 135 for a multi-domain halftone display. Initially, the thin film transistor (TFT) array having halftone subpixels with control capacitors is fabricated on a first glass substrate 186, which is about 43 mils thick. The control capacitors $C_1$, $C_2$, $C_3$, and $C_4$ for subpixels 162, 163, 164 and 165, respectively, are fabricated by varying the overlap area of a first indium tin oxide (ITO) electrode 161 (that is connected to the TFT drain 160) with a second ITO electrode 167 defining subpixels 162, 163, 164 and 165. First and second ITO layers 161 and 167 are about 1000 angstroms thick and are separated by control capacitor dielectric 192, with an option of a via 166 (shown in FIG. 6) for connecting ITO layer 161 to the #1 subpixel 162 portion of ITO layer 167. This via contact 166 allows the full data voltage from the TFT to be applied to #1 subpixel 162, rather than depending on the capacitance $C_1$ between ITO layer 161 and the subpixel 162 portion of ITO layer 167 for turning on subpixel 162. Via 166 shorts out control capacitor $C_1$. Dielectric layer 192 is about 5000 angstroms thick and is made of silicon dioxide.

The $C_{LC}$, capacitance of equivalent circuit 196 in FIG. 7b is the capacitance between second ITO layer 167 functioning as individual subpixel electrodes on first substrate 186 and second ITO layer 194 functioning as the common electrode on second glass substrate 188 with liquid crystal material 190 as the dielectric, in FIG. 7a. Second glass substrate 188 has a thickness of about 43 mils and common electrode layer 194 has a thickness of about 1000 angstroms.

In the case wherein a white field emitter array backlight is utilized, then between second glass substrate 188 and electrode 194 there is a color filter array 169, if structure 184 is for a color display. Here, color filter array 169 is about 2 to 3 microns thick and is composed of polyimide containing red, green and blue dyes. Immediately contacting liquid crystal material 190 are first and second polyimide alignment layers 195 and 197 which are each about 500 to 1000 angstroms thick. First polyimide alignment layer 195 is formed on ITO layer 167 and second polyimide alignment layer 197 is formed on common electrode ITO layer 194. Between alignment layers 195 and 197, besides liquid crystal material 190, are situated spacers 213 which may be pillars, cylinders or spheres, setting the distance between layers 195 and 197 and supporting a space for liquid crystal material 190. First ITO layer 161, along with TFT 230 is formed on one side of first glass substrate 186. On the other side of first glass substrate 186 is formed a first compensation or retardation film or layer 199. Formed on first compensation layer 199 is first polarizer 201. On second glass substrate 188 is formed a second compensation or retardation film or layer 203. Situated on compensation layer 203 is second polarizer 205. On second polarizer 205 is formed an antireflection and/or an electromagnetic interference resistive layer 207. Backlight 141, 142 and/or 143 is situated proximate to first polarizer 201 for putting light through display 184 via layers 201, 199, 186, 161, 192, 167, 195, 190, 197, 194, 169, 188, 203, 205 and 207, on to a viewer.

Configurations of liquid crystal displays, including those of grayscale capability, and certain fabrication techniques are disclosed in the following listed United States Patents: (1) U.S. Pat. No. 4,840,460, by Anthony Bernot et al., issued Jun. 20, 1989, and entitled "Apparatus and Method for Providing a Gray Scale Capability in a Liquid Crystal Display Unit;" (2) U.S. Pat. No. 5,126,865, by Kalluri Sarma, issued Jun. 30, 1992, and entitled "Liquid Crystal Display with Sub-Pixels;" (3) U.S. Pat. No. 5,162,931, by Scott Holmberg, issued Nov. 10, 1992, and entitled "Method of Manufacturing Flat Panel Backplanes including Redundant Gate Lines and Displays Made thereby;" (4) U.S. Pat. No. 5,191,452, by Kalluri Sarma, issued Mar. 2, 1993, and entitled "Active Matrix Liquid Crystal Display Fabrication for Grayscale;" (5) U.S. Pat. No. 5,204,659, by Kalluri Sarma, issued Apr. 20, 1993, and entitled "Apparatus and Method for providing a Gray Scale in Liquid Crystal Flat Panel Displays;" (6) U.S. Pat. No. 5,258,323, by Kalluri Sarma et al., issued Nov. 2, 1993, and entitled "Single Crystal Silicon on Quartz;" (7) U.S. Pat. No. 5,344,524, by Kalluri Sharma [sic] et al., issued Sep. 6, 1994, and entitled "SOI Substrate Fabrication;" and (8) U.S. Pat. No. 5,281, 840, by Kalluri Sarma, issued Jan. 25, 1994, and entitled "High Mobility Integrated Drivers for Active Matrix Displays;" which are hereby incorporated by reference in this present description. The above-noted patents in this paragraph are assigned to the same assignee of the invention described in this present description.

FIG. 8 shows a basic comb-tooth edge field emitter 20 usable in the field emitter array lamp for liquid crystal displays. Emitter 20 has a lead-in conductor 1, is in electrical connection with an outside voltage source, and is in contact with an emitter structure 3, through a resistive element 5, and a conductive element 6 at electrical contact 2. Lead-in conductor 1 preferably physically contacts only resistive element 5.

Emitter edge 4 of emitter structure 3 is segmented into a plurality of comb-like elements $e_1 \ldots e_n$. The segmentation of the emitter edge serves to isolate burn-out problems.

Localizing the edge length will prevent spreading of the burn-out and confine the problem to its originating comb element.

A resistive film 5, typically but not limited to tantalum nitride or a polysilicon, is formed through thin film construction techniques to be in contact with emitter structure 3 so that the resistance applied is in series with emitter edge 4. The resistive film serves to limit excessive direct current (D.C.) emission currents to the emitter edge from sharp points or uncontrollable discharges from stray capacitance.

A conductive film 6 and an insulator 11, which may be an oxide or nitride, is also obtained through thin film techniques layered above resistive film 5 such that the elements are in parallel with each other. Together, resistive film 5, insulator 11, and conductive film 6 serve as a capacitor which provides a high frequency bypass for alternating current (A.C.) through lead-in conductor 1. The capacitor enables amplification of high frequency microwave signals as if the current limiting load line were due to a very small resistor, thus greatly increasing the gain of the amplifier. This is so because the D.C. current is limited in its ability to damage the emitter by the resistor; and because the bypass capacitor provides another way for the high frequency signal to pass the emitter.

FIGS. 9a and 9b illustrate two emitter edges 61 and 62, respectively, with arrows suggesting electron flow at the edge of each. The ridged edge 62 type is presently preferred because the corners of edge 61 are likely to cause concentration of electron emission and begin failure.

Figure 10:
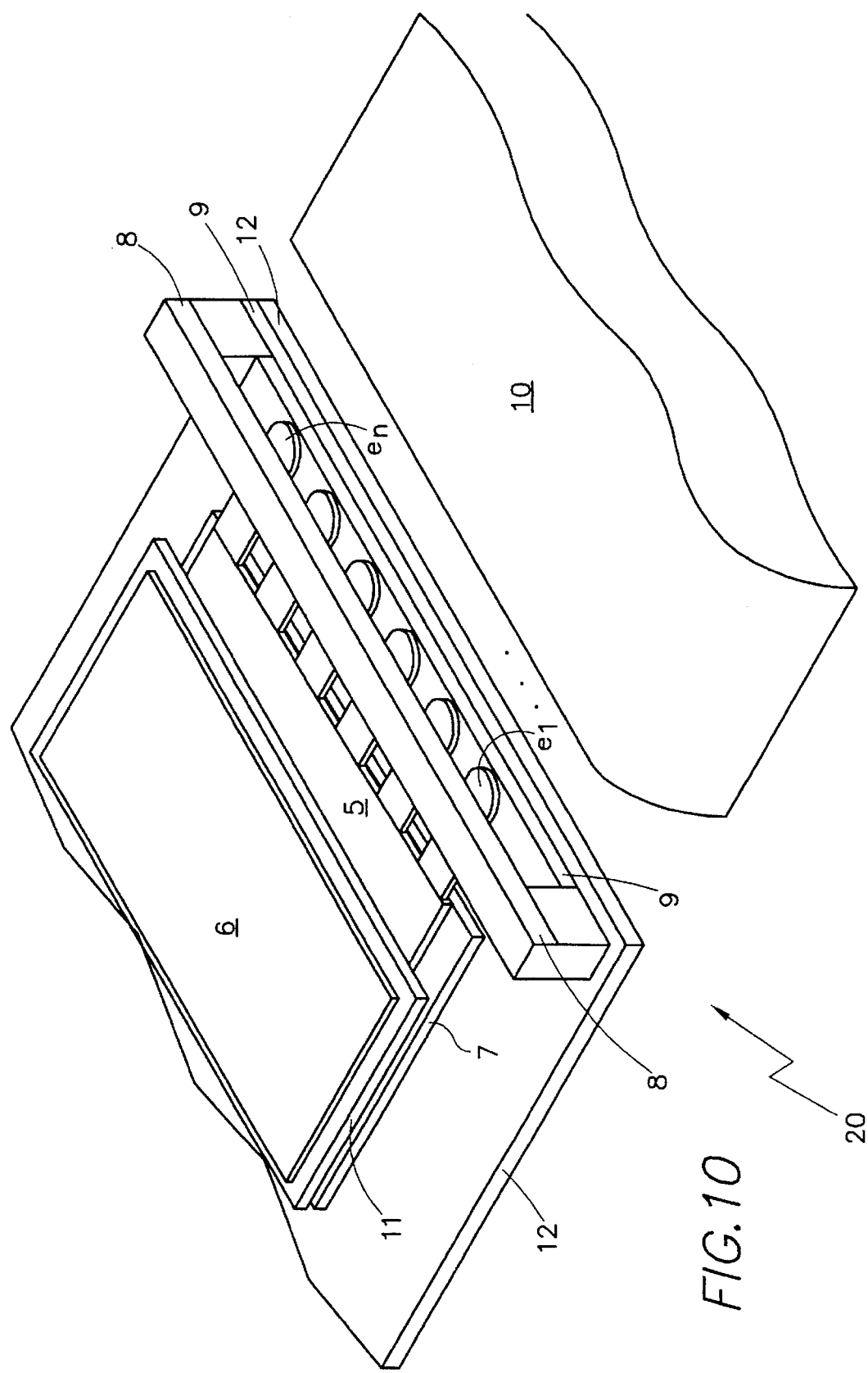
FIG. 10 shows a perspective of an emitter.

FIG. 10 shows a perspective view of the emitter illustrated in FIG. 8. The structure shown at item 7 serves as a support layer. Also visible in this view is insulating substrate layer 12, and upper and lower control electrodes 8 and 9. A control electrode acts as a lateral gate which controls the current flow between anode 10 and electron-emitting cathode 4.

Figure 12:
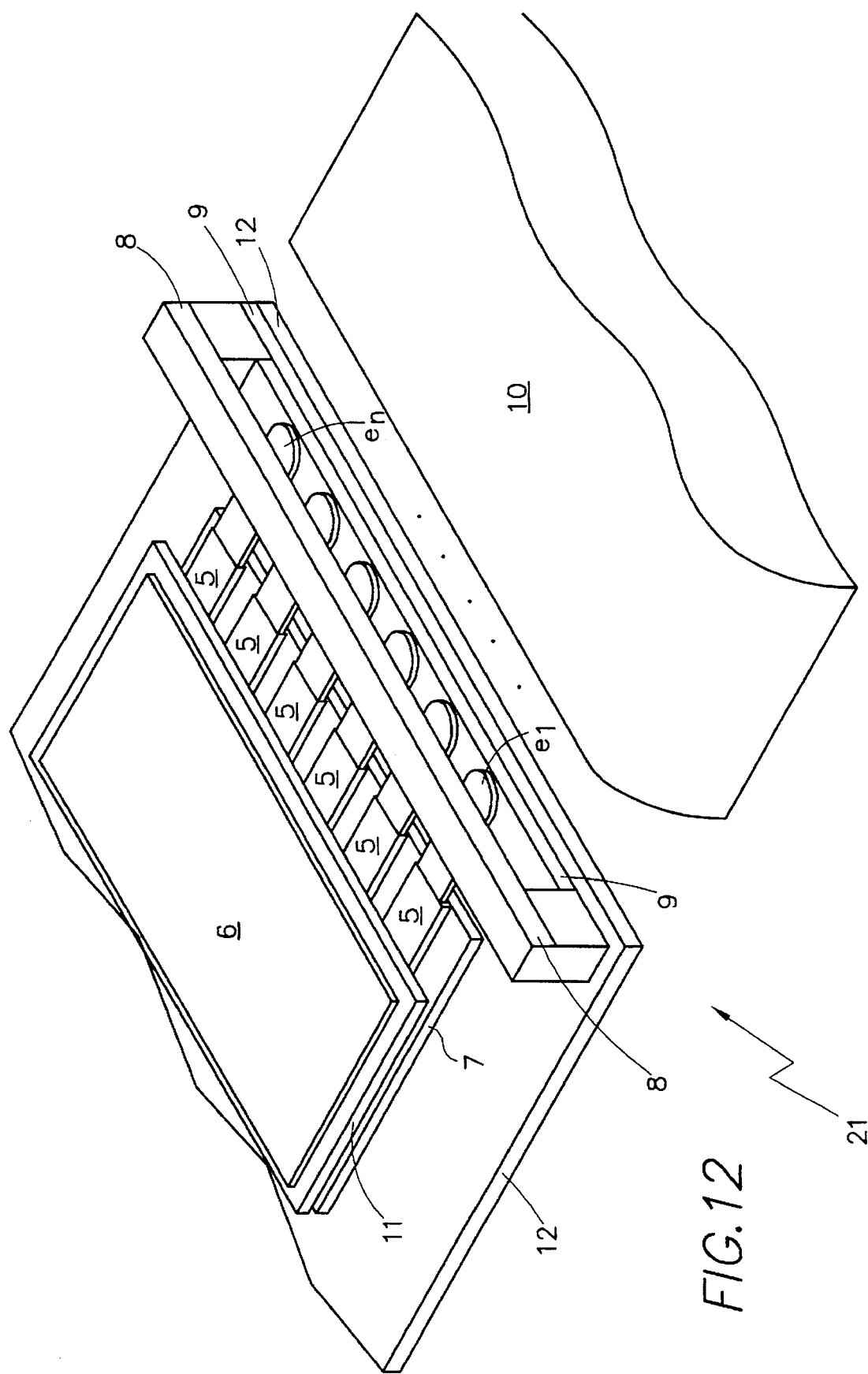

FIGS. 11 and 12 show plan and perspective views, respectively, of a second kind of emitter. In this configuration, the entire emitter structure is segmented into comb-like elements 4. Each comb-like element $e_1 \ldots e_n$ has an individual resistor element 5 connecting it to conductor contact 2.

The arrangement of the second configuration enables a larger total current to be drawn without burning out the individual comb elements. The first configuration shown in FIGS. 8 and 10, enables a lesser amount of total current to be drawn than the second configuration (assuming the two were of the same size), but has a more effective capacitive coupling because of the larger area of the resistive film.

Figure 13:
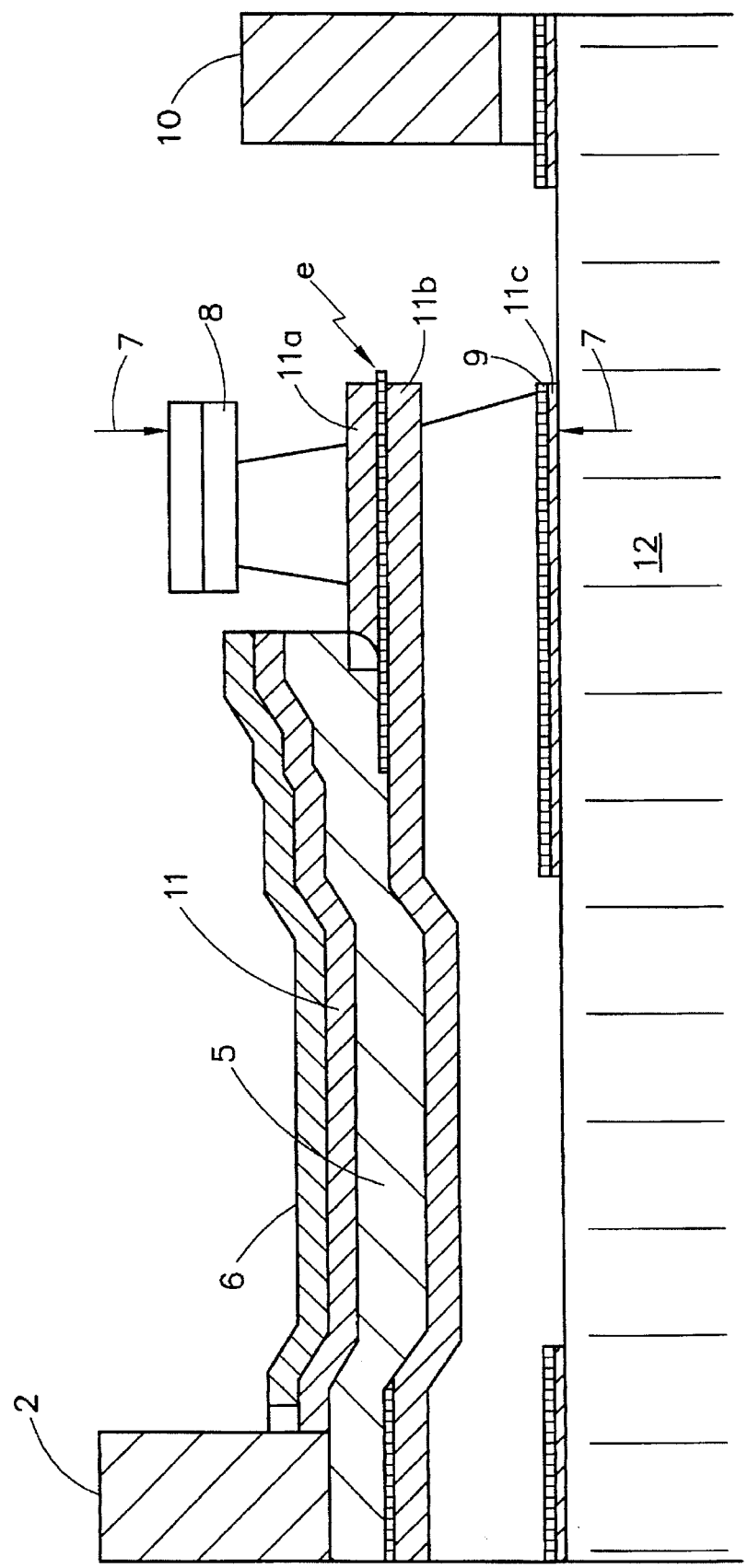
FIG. 13 is a side cutaway view of an emitter.

FIG. 13 shows a side cutaway view which could represent either one of the two configurations of the emitter. Also shown in FIG. 13 is dielectric material 11, between conductive element 6 and resistive element 5, as well as insulating substrate 12 upon which the emitter is constructed.

Figure 14:
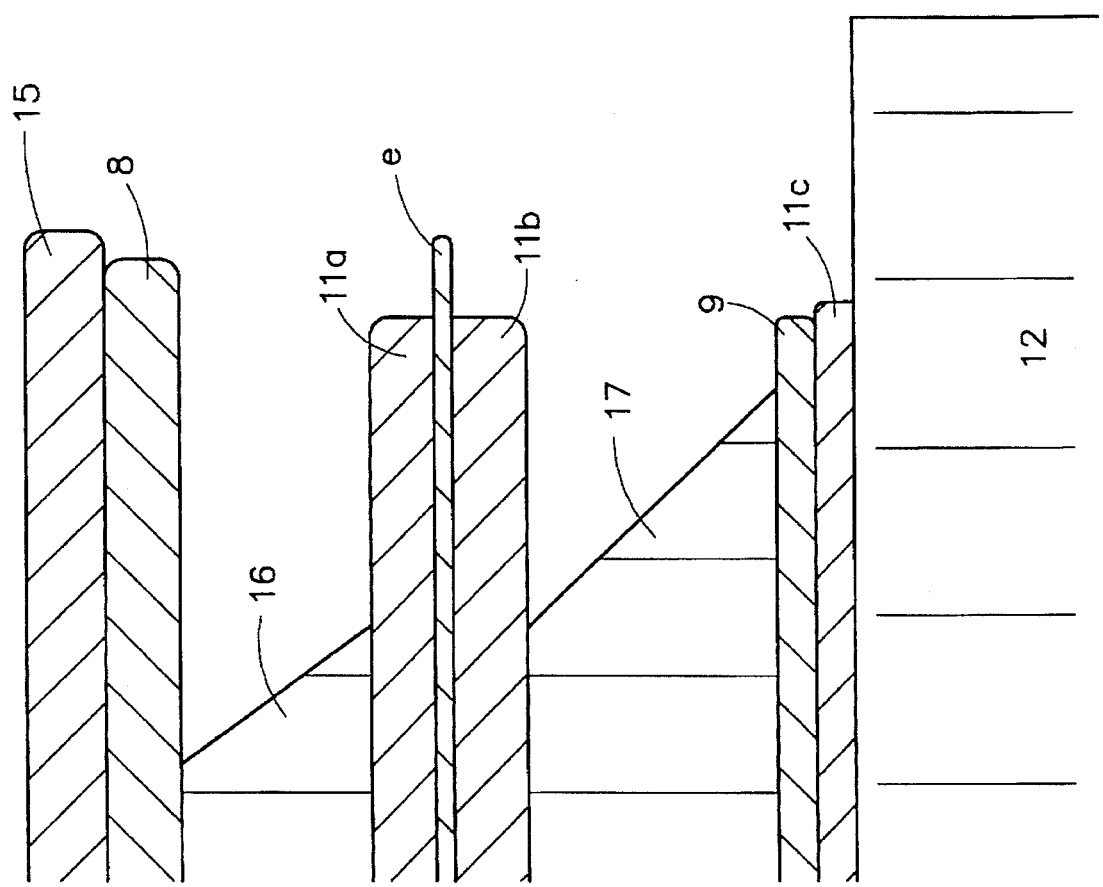
FIG. 14 is a cross-section view from FIG. 13.

FIG. 14 is a detailed side view taken at line 7—7 of FIG. 13. From the top, there is a support layer 15 (preferably nitride, though other well known support layers with similar electrical characteristics could be used). Upper control electrode 8 (preferably TiW, around 2500 angstroms, though other metals or conductive materials could be used), an upper sacrificed layer 16 (preferably $SiO_2$; about 3000 angstroms, although other supporting materials of similar electrical qualities could be substituted); the emitter surrounded by two support layers, i.e., the support layers are nitride 11a and 11b of about 2000 angstroms in thickness and the emitter e, a 300 angstrom layer of TiW, although substitute materials may be used as in the similar above layers). Below this, is another "lower" sacrifice layer 17, similar in makeup and thickness to upper sacrifice layer 16 and lower electrode 9, about 1000 angstroms of TiW. The whole structure is supported by another support layer 11 (of about 1000 angstroms) and laid down upon $SiO_2$ wafer 12. Substitutes such as crystalline silicon can be used.

FIGS. 15a, 15b and 15c illustrate three alternatives for comb structure 4 combined with resistor elements 2. FIG. 15d is a side cross-section view of element e of the configuration shown in FIG. 15b.

FIG. 16 shows a piece 40 of an array employing emitters 41, 42, 43, and 44, and resistor elements 2a, 2b and 2c. Control electrode wires 50, 52 and 54 (metalization or other current carrying structures) and lines 63 and 65 are connected at junctions 51 and 53, respectively, to turn on emitter 41. Such matrix of address lines 50, 52, 54, 63 and 65 may parallel the address switching matrix for the liquid crystal pixels of a display.

Figure 17:
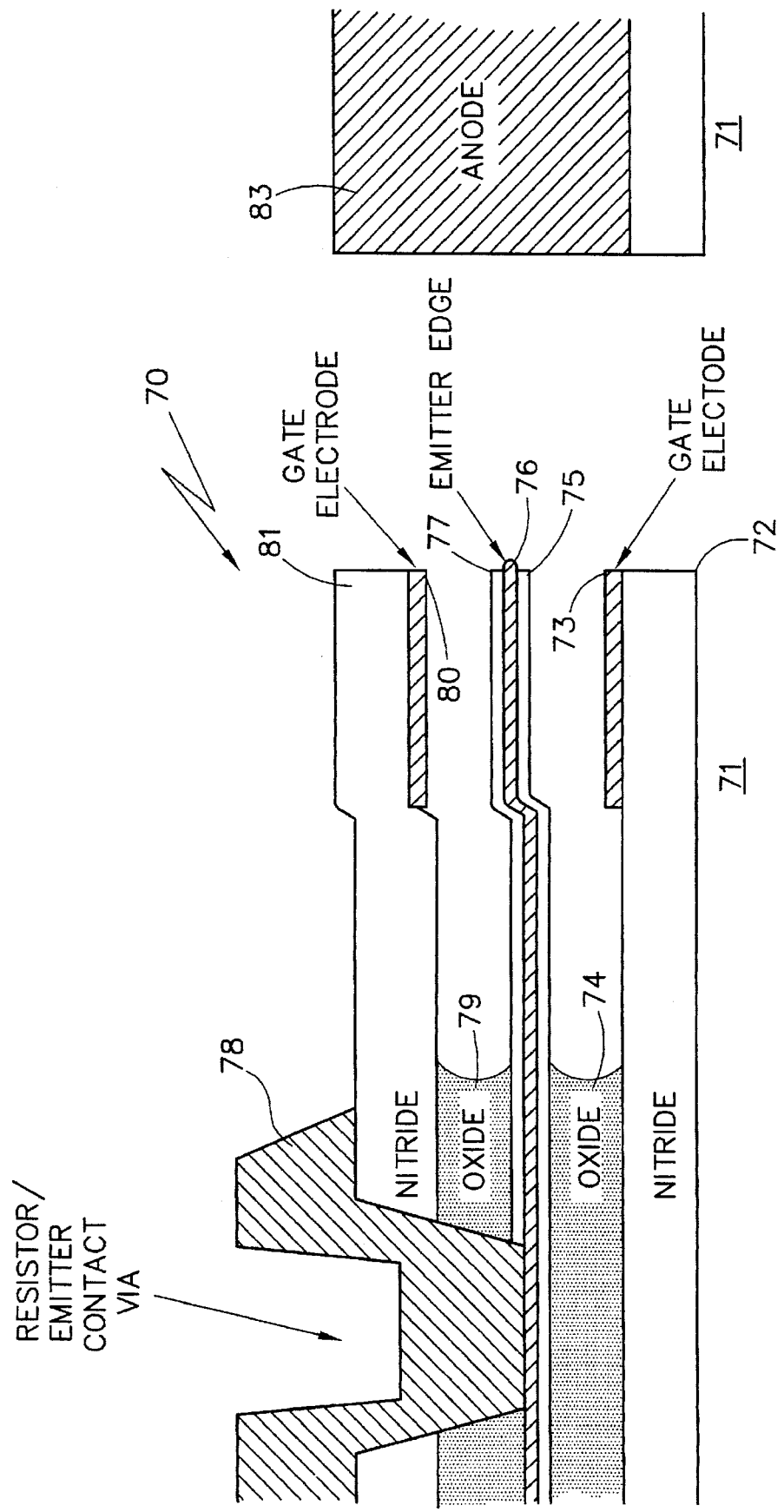
FIG. 17 is a cross-section of a thin-film-edge emitter.

FIG. 17 is a diagram that reveals further details of a thin-film-edge emitter 70 that is used as a lamp in a flat panel liquid crystal display. On a substrate 71 is a nitride layer 72 of about 2500 angstroms. Formed on layer 72 is a gate electrode 73 which is of about 1000 angstroms thick of TiW. Formed on layer 72 is a 3500 angstrom layer 74 of oxide. Found on oxide layer 74 is a 1500 angstrom layer 75 of nitride which is used to support 200 to 300 angstroms of TiW as emitter edge layer 76. A 1500 angstrom nitride layer 77 is formed on emitter edge layer 76. Nitride layers 75 and 77 provide structural support for emitter layer 76. Formed on layer 77 is a 3500 angstrom layer 79 of silicon dioxide. Gate electrode 80 of about 2500 angstroms of TiW is formed on a portion of oxide layer 79. A 2500 angstrom layer 81 is formed on gate electrode 80 and oxide layer 79.

The edges of gate electrodes 73 and 80, and nitride layers 72, 75, 77 and 81 are approximately aligned with the emitting edge of emitter edge layer 76. A via is etched in layers 77, 79 and 81 for forming emitter control via resistive metal, which effectively is a resistor connected in series with emitter edge 76. Metal 78 is TaN. Oxide layers 74 and 79 are etched back about 0.5 micron from the emitting edge of emitter edge layer 76. Also formed on substrate 71 is nitride layer 82 of about 2500 angstroms that is apart from the emitter edge wafer 70. Formed on layer 82 is anode 83 having about 0.5 micron layer of TiW. The metal of items 73, 76, 80 and 83 may be other than TiW but needs to have a similar work function so as to prevent electrochemical reactions that would occur between such items composed of different metals. Anode 83 functions as a focusing electrode for the electrons emitted from emitter edge 76. Anode 83 is adjustable in distance about 1.5 to 4 microns from edge 76, to effect optimum focusing.

Figure 18:
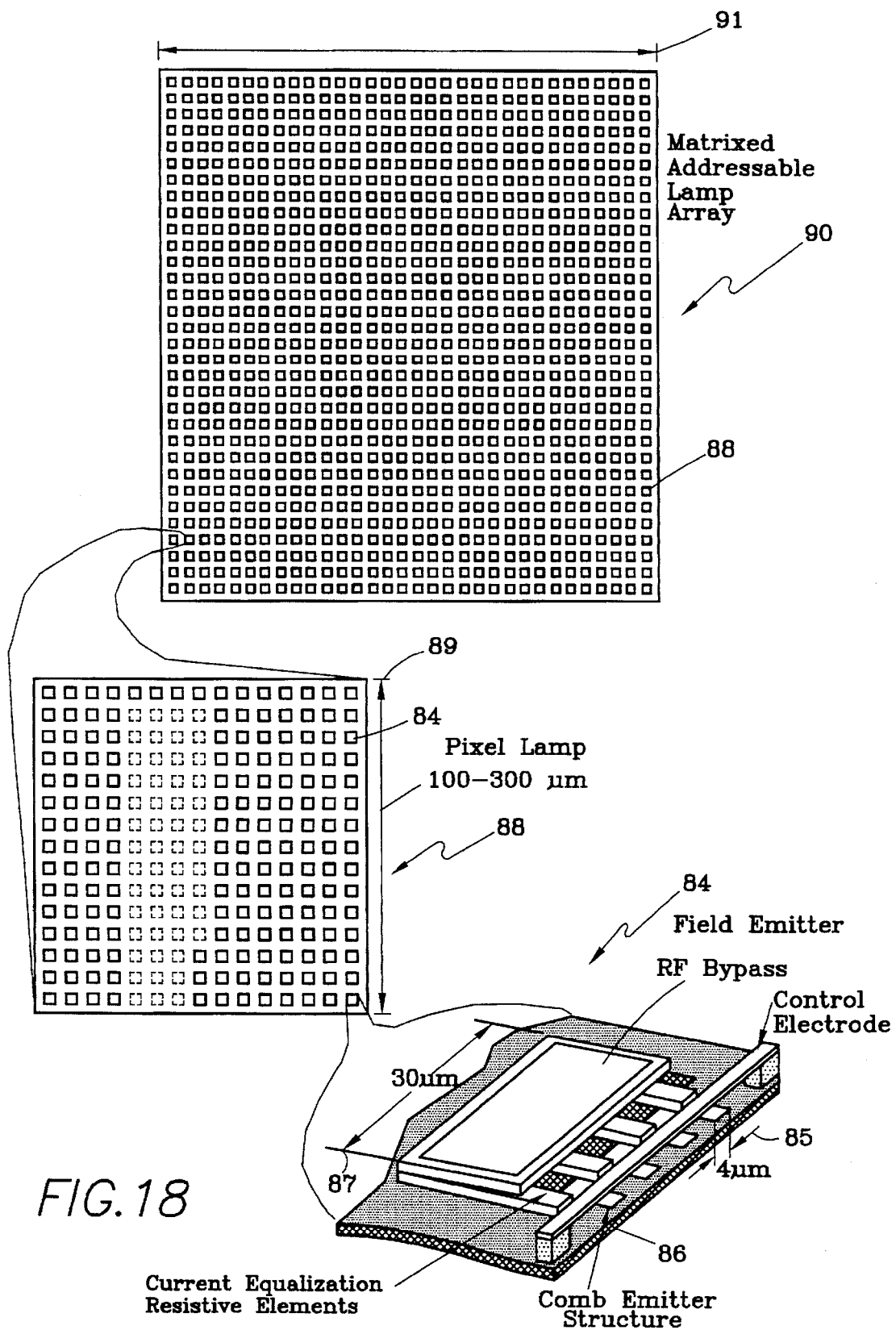
FIG. 18 shows the place of the field emitter in a liquid crystal display.

Emitters 70 may be formed as a comb tooth emitter having a plurality of teeth as assemblies 20 and 21 shown in FIGS. 10 and 12, respectively. The number of teeth of the emitter is not critical but a preferred number for a lamp may be four as field emitter 84 of FIG. 18 has. Each emitter tooth has a width 85 of about 4 microns wide. Emitter 84 has dimension 87 of about 30 microns, and is one of the emitters that compose lamp 88 which has a dimension 89 of 100 to 300 microns on each side. A two dimensional array of pixel lamps 88 compose a matrixed addressable lamp array 90, which parallels a pixel array of a liquid crystal display having a dimension 91 determined by resolution and pixel size. The numbers of emitters 84 in an array 88 and of arrays 88 in matrix 90 are a matter of the design of the liquid crystal display.

Figure 19:
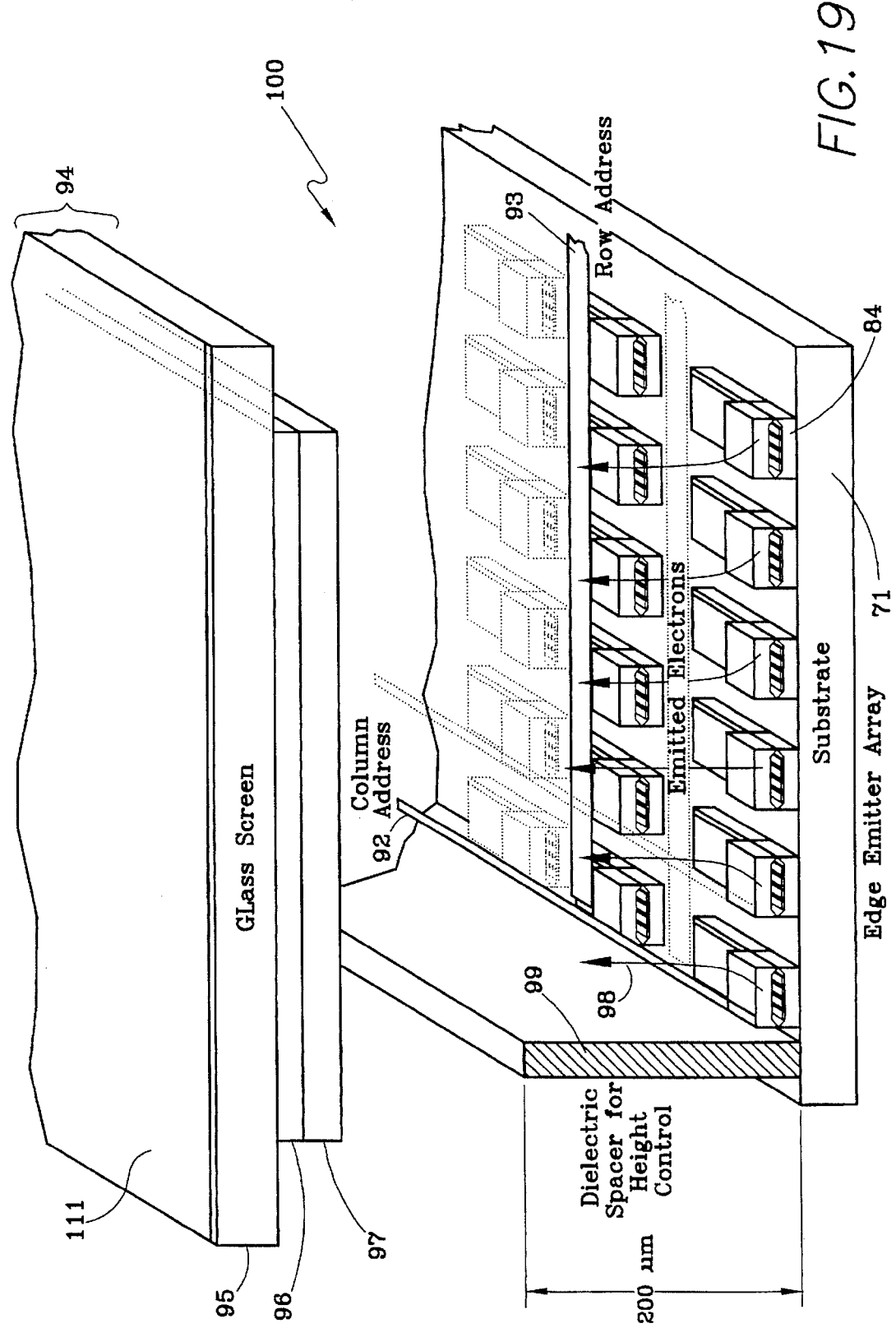
FIG. 19 is a portion of the structure of the field emitter array used as an individual lamp for a liquid crystal pixel.

FIG. 19 shows a portion of the structure of array 100, having field emitters 84 situated on substrate 71. Column address conducting strip 92 and row address conducting strip 93 select the particular emitter array 88 to be turned on to emit electrons which go to an out-of-plane screen 97. Strip 92 is connected to the gate of field emitter 84 and strip 93 is connected to the resistor/emitter of field emitter 84. Screen 94 is composed of a glass plate or substrate 95. A phosphor layer 96 is formed on glass plate or substrate 95 and a thin aluminum (Al) layer 97, transparent to beams 98 of electrons but conductive of electric signals, is formed on phosphor layer 96. Layer 97 is connected to a positive terminal of a voltage source that has the other negative terminal connected to the respective emitters 84. Electron emissions 98 impinge phosphor layer 96 as they go through anode 97. As phosphor layer 96 is impinged by emitted electrons 98, layer 96 emits photons in the area which is impinged by emissions or electrons 98, resulting in a visible indication of light to an observer. The above noted screen configuration is primarily used for high voltage phosphors. In an alternative configuration primarily used for low voltage phosphors, layer 96 may be an indium tin oxide (ITO) film, which is conductive of electric signals but transparent to light, formed on glass plate or substrate 95; and layer 97 may be phosphor formed on layer 96 which is connected to a positive terminal of a voltage source that has the other negative terminal connected to the respective emitters 84. Film or layer 96 is the anode for collecting electron emissions 98 of emitters 84. Electron emissions 98 impinge phosphor layer 97 as they go to anode 96. As phosphor layer 97 is impinged by emitted electrons 98, layer 97 emits photons in the area which is impinged by emissions or electrons 98, resulting in a visible indication of light to an observer. Screen 94 is supported parallel to substrate 71 by dielectric spacer 99 at a distance of between 200 and 10,000 microns between screen 94 and substrate 71.

Figures 20, 22:
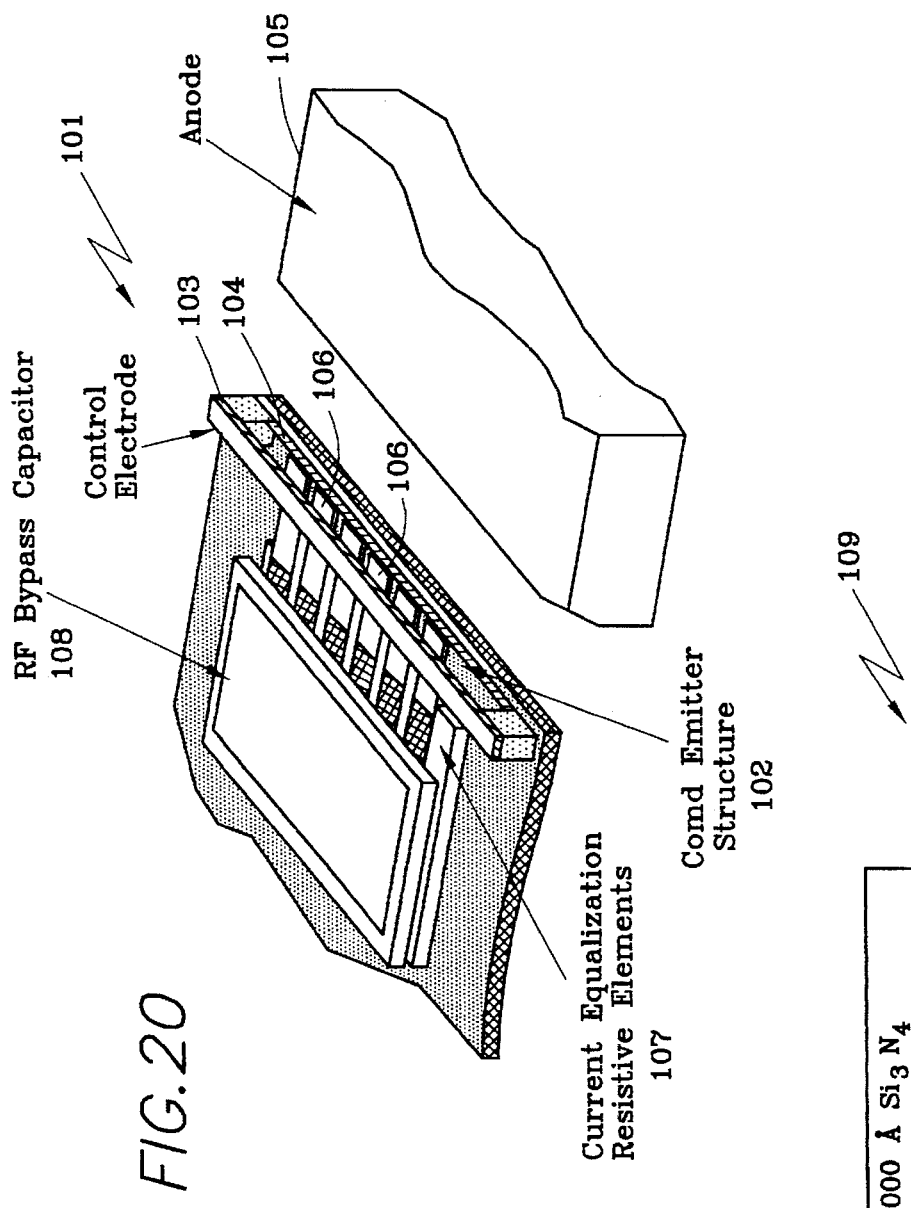
FIG. 20 is a perspective view of a field emitter microstructure.
FIG. 22 illustrates a laminated emitter structure.
Figure 21:
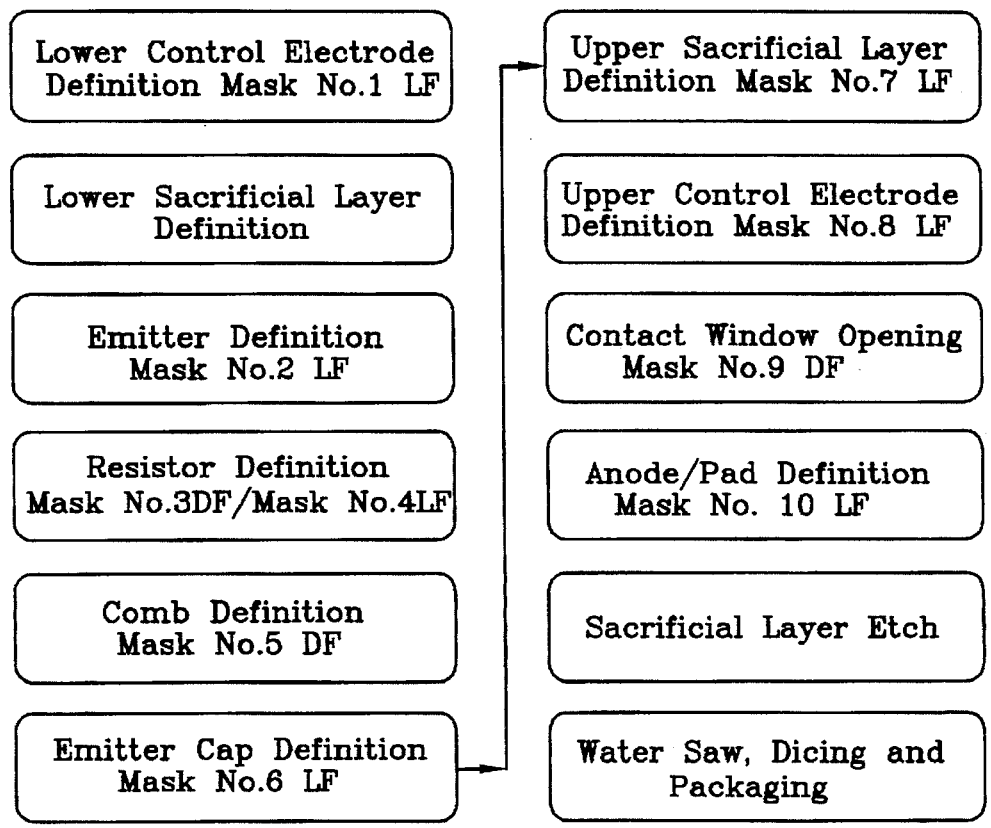
FIG. 21 is a flow chart for fabrication of a field emitter array.

In FIG. 20 is a configuration of a vacuum microelectronic field emitter microstructure 101 that may be used in arrays for radio frequency (RF) amplification. A thin-film-edge emitter 102 is sandwiched between control electrodes 103 and 104. Electrons are emitted laterally from emitter 102 and are collected at anode 105 a few microns away from emitter 102. Structure 101 is fabricated with a process which combines silicon integrated circuit (IC) patterning techniques with surface micromachining, as is outlined as a simplified process in FIG. 21.

Field emitter structure 84 of array 100 in FIG. 19 is similar to structure 101 in FIG. 20. However, anode 105 of structure 101 would be a focusing electrode. Emitter edge 102 of structure 101 is split into comb elements 106 and each emitter comb element or finger 106 is connected individually to a current equalization resistive layer or element 107. Resistive element 107 prevents electromigration and burnout of emitting edge 102 by limiting the D.C. current in each finger 106. Thin-film edge emitter structure 102 having comb resistors 107 for fingers 106, permits individual bias for each emitter thereby preventing a few shorts from pulling the line voltage down. Lateral series resistor 107 is not sensitive to slight fabrication process variations. Thin-film-edge emitter 102 has low intrinsic capacitance. Series resistor 107 of fingers can be bypassed at the appropriate frequencies by a bypass capacitor 108 to allow fast emitter 101 response times.

Emitter edge 102 fingers 106 need to be thin (i.e., <200 angstroms) to attain the high electric fields for low-voltage emission. The ideal emitter structure is a tapered lateral emitter having a very thin emitting edge, which is difficult to achieve in a thin-film-edge emitter form. FIG. 22 shows a compromise laminated emitter structure 109 that combines the advantages of the thin-film-edge sharpness with the current carrying capability of a thick film. The operating gate voltage is kept reasonably low by using a low workfunction emitter composed of LAB6, CeB6, Cs-implanted W or Cs-implanted TiW.

Figure 23:
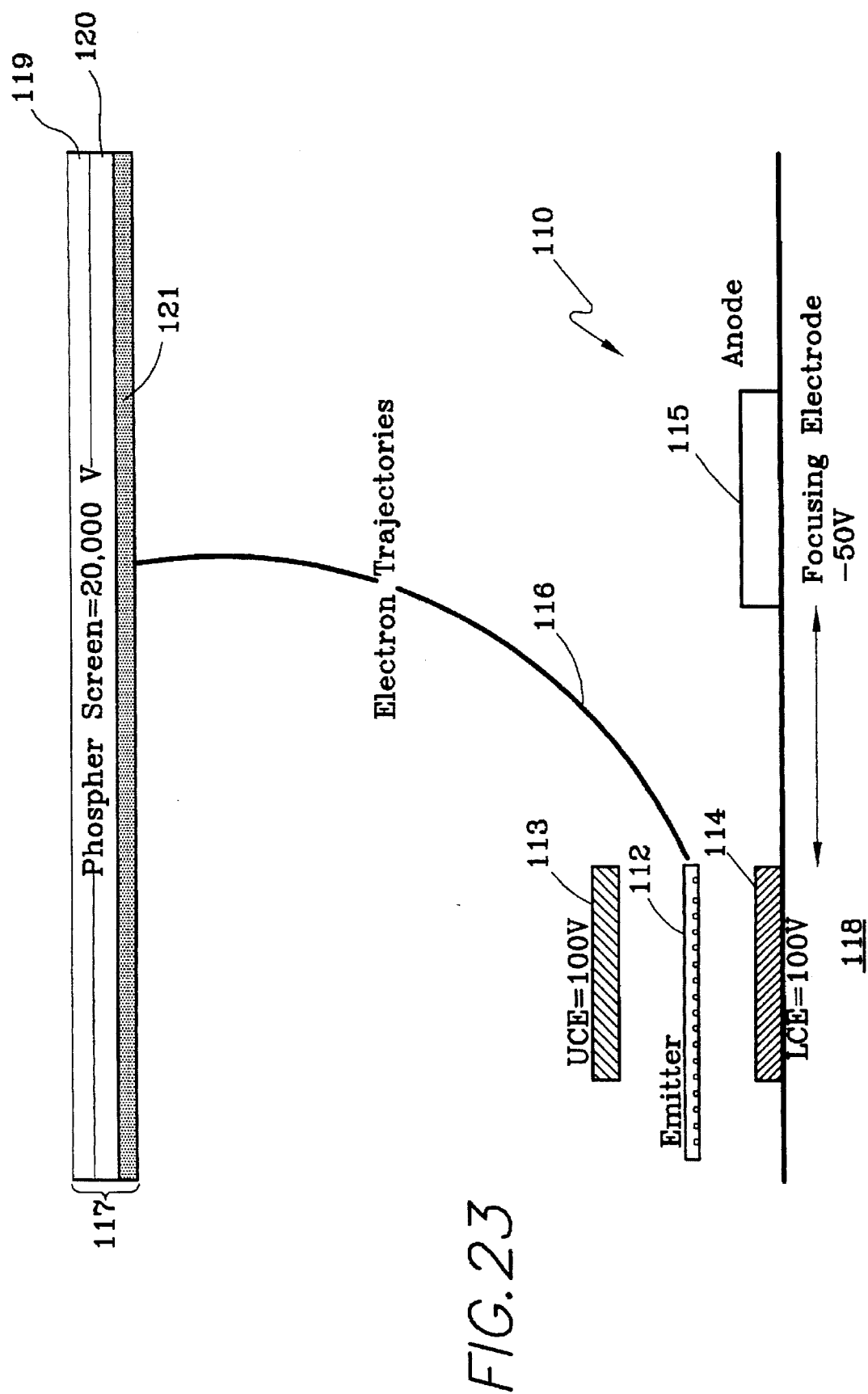
FIG. 23 shows a dual control electrode emitter structure.

Several field emitter structures, based on the thin-film-edge emitter, are suitable for lamps. One is a dual control electrode structure 110 in FIG. 23, which resembles a vacuum transistor used for RF amplification. Emitter 112 is symmetrically placed between an upper control electrode 113 above emitter 112 and a lower control electrode 114 situated on substrate 118 below emitter 112. Electrodes 113 and 114 are electron emission 116 intensity controlling gates. Electrodes 113 and 114 are each spaced at 0.5 microns apart from emitter 112. The anode of a vacuum transistor is used as a focusing electrode 115, situated on substrate 118, which is biased between a minus 20 and minus 50 volts, typically at a minus 35 volts, with respect to emitter 112. Electrode 115 is about 4 microns from emitter 112. Emitter 112 is set at zero volts and control electrodes 113 and 114 are set at about a plus 100 volts. The negative bias on electrode 115 turn electrons 116 form a lateral direction to a vertical direction toward screen 117. Screen 117 has a glass plate 119 with an ITO layer 120 formed on it. ITO layer 120 is connected as an anode or collector for electrons 116. Formed on ITO layer 120 is a layer of phosphor 121. Phosphor layer 121 is about 2,500 microns in distance from parallel substrate 118. Collector 120 is biased at a positive 20,000 volts (i.e., at a field of 8 volts per micron). The electron energy spread of emission 116 is about 0.1 electron volt (eV) and the emission angle is ±45 degrees.

Figure 24:
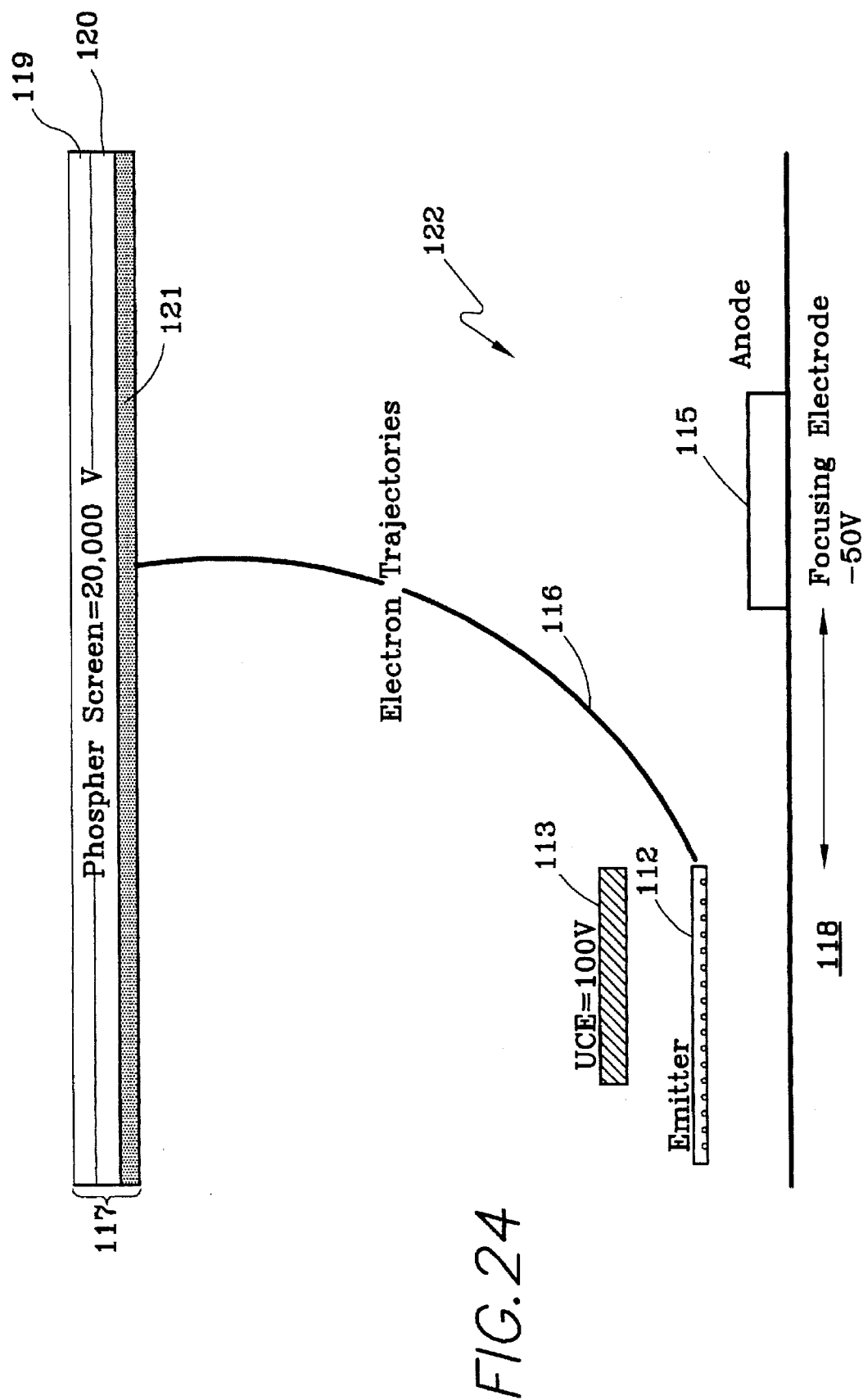
FIG. 24 shows a single control electrode emitter structure.

Another lamp field emitter structure is the single control electrode configuration 122 shown in FIG. 24. Configuration 122 has the same items, physical dimensions, voltage requirements, and operational characteristics as configuration 110 of FIG. 23. The only distinction is that there is no lower electrode or gate 114 in configuration 122. The position and height of focus electrode 115 has an effect on the collimation of electrons 116. The best position for electrode 115 is below emitter 112 for configuration 110 and is at the same level as upper control gate 113 for configuration 122. The electrons seem to be better collimated in configuration 122. Both configurations 110 and 122 are little susceptible to emitter 112 erosion by energetic particles desorbed by electron 116 bombardment of phosphor screen 121.

Phosphor layer 121 acts as the anode and may be deposited on the glass. This may be followed by a thin layer 120 of Al which is a conducting layer and also acts as a reflector. In operation, the emitted electrons travel to anode 121, causing luminous emission when they impinge on phosphor screen 121. High-voltage phosphors are much better than low-voltage phosphors because the brightness is proportional to the accelerating voltage and the current density, and phosphor lifetime is inversely proportional to the deposited charge density. The following table compares the characteristics of low- and high-voltage cathodoluminescent phosphors.

|       | Low Voltage<br>200 V, 100 µA/cm² | | High Voltage<br>16 KV, 4 µA/cm² | |
|-------|----------------------|---------------------|-------------------|-------------------|
| Color | Material | Efficiency (lm/W) | Material | Efficiency (lm/W) |
| Red   | $Zn_{0.2}Cd_{0.8}S$:Ag, Cl | 1.3 | $Y_2O_3$:Eu | 18 |
| Green | $Zn_{0.62}Cd_{0.38}S$:Ag, Cl | 4.5 | $Gd_2O_2S$:Tb | 33.0 |
| Blue  | ZnS:Ag, Al | 0.6 | ZnS:Ag | 3.0 |

Brightness ∝ accelerating voltage
Brightness ∝ current density
Life ∝ 1/deposited charge In FIG. 19, the phosphor screen is part of individual edge emitter array 84. Array 100 may emit one of several colors, depending on the kind of phosphor 97 that screen 94 has. The above table gives examples of materials used for attaining red, green and blue light emitting phosphors. Pixel 88 of an array of field emitters 84, along with a phosphor screen 94 like that of FIG. 19, may be designed to emit red, green or blue light, even light of another color with the appropriate phosphor. Thus, red, green and blue pixels can be placed in matrixed addressable pixel array 90, for obtaining a full color field emitter lighted liquid crystal display. The pixel layout, for instance, may be that each pixel of a given color is bordered by pixels of the other colors. Examples of color pixel formats, for three and four color matrix arrays, are set forth in the related art, such as a U.S. Pat. No. 4,800,375, by Louis Silverstein et al., issued Jan. 24, 1989, and entitled "Four Color Repetitive Sequence Matrix Array for Flat Panel Displays," which is hereby incorporated by reference in this description.

For lifetime considerations, high-voltage phosphors are better than low voltage phosphors. An issue that needs to be addressed is the breakdown of dielectric spacers due to the high anode voltages. However, dielectric breakdown should not be an issue since at 20,000 volts, the electric field of dielectric spacers 99 (in FIG. 19) is below $10^5$ V/cm.

Figure 25:
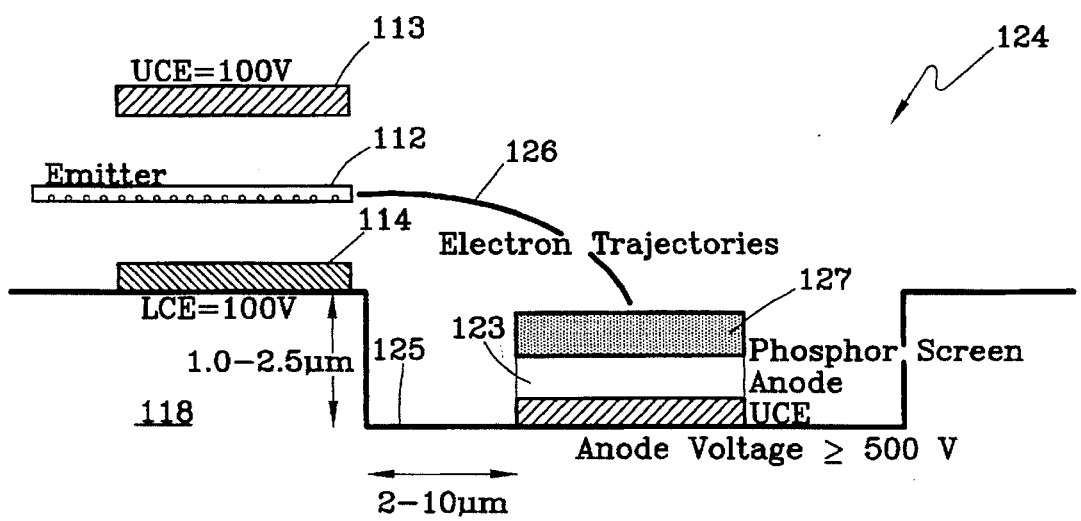
FIG. 25 reveals a planar thin film edge field emitter, having an individual low voltage phosphor screen on the same substrate as the field emitter.

A third lamp field emitter structure is an on-chip phosphor screen configuration 124 in FIG. 25. Configuration 124 is a derivative of configuration 110. A trench 125, between 1.0 to 2.5 microns deep, is etched (with micromachining) in substrate 118 in the area of former focusing electrode 115. An anode 123 is deposited in trench 125. After the anode 123 deposition, a phosphor layer 127 is defined by e-beam evaporation and lift-off. Electrons 126 go from emitter 112 towards phosphor screen 127 and anode 123, to emit photons for viewing. Laterally, anode 123 is between 2 to 10 microns from the nearest edge of emitter 112. The anode 123 voltage is equal to or greater than positive 500 volts relative to emitter 112 which is at a zero voltage. Upper control gate 113 and lower control gate 114 are at 100 volts and situated similarly relative to emitter 112 as in configuration 110 of FIG. 23.

We claim:

1. A flat panel display comprising:
   a plurality of liquid crystal pixels situated in a first plane; and
   a plurality of field emitter arrays situated in a second plane; and
   wherein:
      said first and second planes are approximately parallel to each other; and
      at least one field emitter array of said plurality of field emitter arrays is positioned proximate to each liquid crystal pixel, such that the at least one field emitter array functions substantially continuously as a backlight for each liquid crystal pixel that is activated; and
      said plurality of liquid crystal pixels and plurality of field emitter arrays are arranged such that each pixel, having sides and capable of providing a certain color, is bordered by pixels, along the sides, that are capable of providing a color different from the certain color; and
      each pixel of said plurality of liquid crystal pixels is a gray-scale pixel capable of providing the certain color at a variable intensity.

2. The flat panel display of claim 1 further comprising:
   a first plurality of address lines connected to said plurality of liquid crystal pixels; and
   a second plurality of address lines connected to said plurality of field emitter arrays; and
   wherein:
      the at least one field emitter array that functions as a backlight for each liquid crystal pixel is capable of emitting light of a color from a group consisting of at least three different colors, in accordance with a signal from and address line of said second plurality of address lines;
      each liquid crystal pixel is capable of passing a spot of color from a proximate field emitter array, providing a particular intensity to an observer, in accordance with a signal form an address line of said first plurality of address lines; and
      said plurality of liquid crystal pixels are capable of providing a full color display in the first plane.

3. A field emitter array lighted liquid crystal display comprising a plurality of pixels, wherein each pixel comprises:
   a plurality of subpixels which provide a variable grayscale output according to a signal applied to the pixel, from no subpixel being activated to all of the plurality of subpixels being activated according to a magnitude indication of the signal; and
   at least one field emitter array, proximate to the pixel, for emitting substantially continuous light of a first, second or third color through the pixel when the pixel is activated.

4. The display of claim 3 wherein:
   said plurality of pixels comprises:
      a first group of pixels having a capability of displaying light of the first color;
      a second group of pixels having a capability of displaying light of the second color; and
      a third group of pixels having a capability of displaying light of the third color; and
   said plurality of pixels are arranged such that each pixel of one group of pixels is proximate to pixels of the other two groups of pixels.

5. The display of claim 4 wherein said field emitter array comprises at least one field emitter.

6. The display of claim 5 wherein the at least one field emitter is a thin film edge field emitter.

7. The display of claim 6 wherein the thin film edge field emitter comprises:
   a cathode for emitting electrons;
   a resistor element, connected to the cathode for limiting electrical current to the cathode;
   an anode for attracting electrons emitted by the cathode; and
   a phosphor screen proximate to the anode for being impinged by electrons attracted by the anode and for emitting light caused by impinging electrons.

8. The display of claim 7 wherein the cathode has a comb-shaped structure.

9. The display of claim 8 wherein the color of light emitted by the phosphor screen is determined by the type of phosphor on the phosphor screen.

10. The display of claim 9 wherein the thin film edge field emitter comprises a control electrode for controlling the intensity and/or direction of electrons emitted by the cathode.

11. The display of claim 10 wherein the thin film edge field emitter comprises a focusing electrode for focusing the electrons emitted by the cathode, on the anode.

12. The display of claim 11 wherein the thin film edge field emitter comprises a second control electrode for further controlling the intensity and/or direction of electrons emitted by the cathode.

13. The display of claim 3 wherein the at least one field emitter array proximate to the each pixel of said plurality of pixels, is connected to the respective each pixel, such that when the each pixel receives a signal applied to the pixel, the respective at least one field emitter array emits light.

14. A flat panel display comprising:

a plurality of field emitter arrays;

a plurality of gray-scale liquid crystal pixels on a substrate, each gray-scale liquid crystal pixel being proximate to at least one of said field emitter arrays and wherein said field emitter arrays function as substantially continuous backlights for said gray-scale liquid crystal pixels when said gray-scale liquid crystal pixels are activated; and a plurality of address lines connected to said plurality of gray-scale liquid crystals.

15. The display of claim 14 wherein:

said display comprises at least three field emitter arrays;

a first field emitter array is capable of emitting light of a first color;

a second field emitter array is capable of emitting light of a second color; and a third field emitter array is capable of emitting light of a third color.

16. The display of claim 15 further comprising:

a first electronic means, connected to said plurality of address lines, for interfacing external signals to said plurality of gray-scale liquid crystal pixels, wherein said pixels are switched on at various levels of gray-scale and switched off so as to display information conveyed by the external signals; and a second electronic means coupling said first electronic means to said first, second and third field emitter arrays so as to display the information conveyed by the external signals in full color.

17. The display of claim 16 wherein each field emitter of said first, second and third field emitter arrays comprises:

a cathode for emitting electrons;

an anode for receiving electrons;

a phosphor screen, situated at said anode such that electrons emitted from said cathode impinge said phosphor screen such that said phosphor screen emits photons of a certain color determined by the type of phosphor on said phosphor screen; and a control electrode for controlling an intensity of electrons emitted from said cathode.

18. The display of claim 17 wherein:

the first color is red;

the second color is blue; and the third color is green.

19. The display of claim 17 wherein:

the first color is cyan;

the second color is yellow; and the third color is magenta.

20. A field emitter array lighted liquid crystal display comprising a plurality of pixels, wherein each pixel comprises:

a plurality of subpixels which provide a variable grayscale output according to a signal applied to the pixel, from no subpixel being activated to all of the plurality of subpixels being activated according to a magnitude indication of the signal; and at least one field emitter array, proximate to the pixel, for emitting light of a first, second or third color through the pixel; wherein each field emitter array comprises a thin film edge field emitter, each thin film edge field emitter comprising:

a resistor element, coupled to a cathode of the field emitter for limiting electrical current to the cathode; and a capacitive element connected in parallel with the resistor element for conducting varying amplitude electrical current signals to the cathode.

21. A flat panel display comprising:

a plurality of gray-scale liquid crystal pixels on a substrate;

a plurality of address lines connected to said plurality of gray-scale liquid crystal pixels;

a first plurality of field emitter array strips capable of emitting light of a first color;

a second plurality of field emitter array strips capable of emitting light of a second color;

a third plurality of field emitter array strips capable of emitting light of a third color;

first electronics means, connected to said plurality of address lines, for interfacing external signals to said plurality of gray-scale liquid crystal pixels, wherein said pixels are switched on at various levels of gray scale and switched off, so as to display information conveyed by the external signals; and second electronic means coupled to first, second and third pluralities of field emitter array strips of first, second and third colors, respectively, so as to display the information conveyed by the external signals, in full color, through substantially continuous backlighting of said gray-scale liquid crystal pixels; and wherein:

strips of said first, second and third pluralities of field emitter array strips are side-by-side and alternate so that each strip of one plurality is adjacent to strips of both other pluralities; and the strips are proximate to and aligned with rows of pixels of said plurality of gray-scale liquid crystal pixels.

* * * * *